(12) United States Patent
Chen et al.

(10) Patent No.: US 8,016,270 B2
(45) Date of Patent: Sep. 13, 2011

(54) PORTABLE MISTING DEVICE

(76) Inventors: Yung Chen, Clarendon Hills, IL (US); Eric F. Junkel, Mount Prospect, IL (US)

( * ) Notice: Subject to any disclaimer, the term of this patent is extended or adjusted under 35 U.S.C. 154(b) by 1110 days.

(21) Appl. No.: 11/653,133

(22) Filed: Jan. 16, 2007

(65) Prior Publication Data

US 2008/0169575 A1    Jul. 17, 2008

(51) Int. Cl.
  *B01F 3/04*    (2006.01)
(52) U.S. Cl. ............... 261/28; 261/78.2; 261/DIG. 43
(58) Field of Classification Search .......... 261/28, 261/89, 90, DIG. 3, DIG. 43, 78.2; 239/289
  See application file for complete search history.

(56) References Cited

U.S. PATENT DOCUMENTS

| | | | | |
|---|---|---|---|---|
| 2,076,192 A | * | 4/1937 | Carr | 261/90 |
| 2,079,117 A | * | 5/1937 | Hays | 261/30 |
| 3,004,403 A | * | 10/1961 | Laporte | 62/311 |
| 4,221,331 A | * | 9/1980 | Goran, Jr. | 239/121 |
| D349,954 S | * | 8/1994 | Steiner et al. | D23/328 |
| 5,338,495 A | * | 8/1994 | Steiner et al. | 261/28 |
| 5,620,633 A | * | 4/1997 | Junkel et al. | 261/28 |
| 5,667,732 A | * | 9/1997 | Lederer | 261/28 |
| 5,752,662 A | * | 5/1998 | Hsu | 239/215 |
| 5,843,344 A | * | 12/1998 | Junkel et al. | 261/28 |
| 5,965,067 A | * | 10/1999 | Junkel et al. | 261/28 |
| 6,378,845 B1 | * | 4/2002 | Hsu | 261/28 |
| 6,398,132 B1 | * | 6/2002 | Junkel et al. | 239/289 |
| 6,827,290 B2 | * | 12/2004 | Zimmerman | 239/215 |
| D544,078 S | * | 6/2007 | Geringer | D23/328 |
| 2002/0148909 A1 | * | 10/2002 | Junkel et al. | 239/289 |
| 2006/0273195 A1 | * | 12/2006 | Junkel | 239/222.11 |

* cited by examiner

*Primary Examiner* — Scott Bushey
(74) *Attorney, Agent, or Firm* — Basil E Demeur; Alan B Samlan; David J Hurley

(57) ABSTRACT

An improved portable misting fan device of the type formed by a body carrying fan means for creating and moving a stream of air, the body further provided with a reservoir and having a power source for driving the fan means and electrical means for driving the power source which further includes a powered mist generator having driving means and an actuator for actuating the mist generator, the mist generator being in fluid communication with the reservoir and a mist nozzle adapted to receive a fluid mist from the mist generator and deliver the same into the air stream created by the fan means.

4 Claims, 19 Drawing Sheets

PORTABLE MISTING DEVICE

BACKGROUND OF THE INVENTION

The present invention is directed to the art field relating to portable misting fans. Typically, such devices are provided with a fan that is in communication with a fluid sprayer to provide a source of atomized fluid. The device typically employs a trigger which operates a manual pump, the manual pump pumping fluid from the fluid reservoir up to a nozzle which is located adjacent to the fan such that the pumping of fluid up to the nozzle and ejecting fluid from the nozzle into the air stream created by the fan will cause the water droplets to break up, and as the fluid droplets enter into the air stream, create a cooling effect for the user.

Such devices have found a widespread use in connection with the public. It has been observed that these devices are basically employed as a personal air conditioning device and have particular application in any environment that is hot and/or hot and dry. These devices are typically employed by sunbathers, sports enthusiasts, and in work environments wherein a worker finds himself in a very closed in, hot and/or dry situation. Hence, such devices have developed widespread use in connection with a number of activities.

Hence, water misting fans generally are devices providing personal and environmental cooling by spraying atomized water droplets into an air stream. The droplets evaporate thereby drawing heat out of the surrounding area. Unevaporated droplets impinge on the user and further evaporation draws heat out of clothing and the skin of the user or surrounding surfaces. As is well known in the past, such devices when employed on static structures have been referred to as swamp coolers which basically operate by passing air through a wick wetted with water and, by the use of fans, propel the chilled air into the area to be cooled. The drawback of swamp coolers is that they work poorly in confined or humid environments and are more suited to a hot but low humidity environment. Furthermore, a swamp cooler generally increases humidity, which can decrease the user's comfort.

It has now been observed that the utility of the device can be greatly improved by decreasing the size of the water droplets and/or increasing the air flow so that the greater cooling effect is realized. The difficulty with the existing devices is that a manually actuated piston pump such as the type having a trigger manually actuated by the user requires a significant effort by the user in order to generate the high pressures needed for atomization of the water. This is a drawback in connection with a user who must employ both hands in connection with whatever activity the user is involved in at the time. Furthermore, elderly people with conditions such as arthritis and the like, find it virtually impossible to manipulate the trigger in order to cause atomization of the fluid. The same is true with small children who have small hands and are not able to actuate the trigger with sufficient force in order to cause a piston pump to operate effectively to draw fluid from the reservoir and eject it from the nozzle into the air stream created by the fan.

Further problems have been noted in connection with the existing devices. These include having parts vulnerable to breakage such as the triggers, attachment collars, and the couplings between the various parts of the device. For example, typically, a water misting fan includes a spray head portion having the fan mounted thereon, and the fan head portion is attached to a fluid reservoir. Such attachment can be by a screw thread, other means, but does require the uncoupling of the device for purposes of filling the reservoir, changing the batteries, or removing the fan for separate use where such fan portions are detachable. Such vulnerable parts lead to breakage problems, which detracts from the desirability of purchasing and using such a device. Even more importantly, the fact that the pump must be operated by a manual trigger for actuating a pump often results in the fact that the user cannot pull the trigger far enough or fast enough to create the pressure necessary to bring a stream of fluid into the air stream created by the fan. This detracts from the device's ability to properly mist.

In terms of the prior art, there are many prior art devices that relate to this art field. Some of the older prior art patents include the patent to Hayes U.S. Pat. No. 2,079,117 where water is discharged out of the surface of the fan blades from which it is ejected in order to create a vapor. Water is pumped out of the reservoir with the fan blades acting as a centrifugal pump. Any excess water that is flung off the tips of the blades are collected by the shroud around the fan blades and recirculated to the reservoir. A rotary union connects the feeder tubes on each blade to a water supply and a squeeze bulb primes the pump system. Hence, the device shown in the aforesaid Hayes patent is not really a misting fan and it does not teach a misting function.

The advent of the current portable misting fans is described in U.S. Pat. No. 4,839,106 which shows a portable misting fan which is in a self contained unit and has an elongated configuration in order to accommodate the provision therein of a fluid reservoir. The device has an extended neck portion with a fan positioned at the top end along with an atomizing head. As described therein, fluid is pumped from the fluid reservoir upwardly to the atomizing end that is located below the fan and as fluid is extracted from the atomizing head, the fan, which is located behind a baffle, blows the fluid onto the body of the operator.

An improvement over the aforesaid device is shown in U.S. Pat. No. 5,338,495. In this patent, there is disclosed what the inventor describes as an integral portable fan and atomizing head unit forming a cooling unit adapted for direct attachment to a fluid reservoir which is a bottle. The upper chamber is provided with an electric motor and electrical means to activate and de-activate the motor, the fan means including flexible fan blades mounted externally on the upper chamber connected to the motor to turn in response from the activation of the motor. The lower chamber is provided with pump activation means in the form of a trigger that requires manipulation by the user in order to pump water from the reservoir up into the path of the air stream created by the fan. The upper head unit is intended to disengagably engage to the fluid reservoir that may consist of a bottle and the connection being a threaded cap which seats onto a threaded neck. As was indicated previously, such devices require the physical manipulation from the user in order to pull the trigger in order to activate the pump and to pump fluid from the reservoir into the air stream created by the fan.

The present invention is intended to provide an improvement over such devices by providing a portable misting fan having a powered misting device incorporated into the unit. A powered misting device thereby eliminates the requirement that the user manually actuate or manipulate a trigger or any other type of device for causing the pump to operate in order to bring fluid from the reservoir into the air stream. Portability is maintained by providing typical batteries whether the same are dry cell or rechargeable, for powering not only the fan, but the misting device as well. It is therefore contemplated that the invention as described herein, once activated by the user, results in a hands free operation that can provide fan only cooling, or fan plus misting as a cooling effect. In either event, appropriate controls are provided so that the user may operate the appropriate controls and allow the unit to operate virtually automatically.

It will therefore be appreciated that the present invention has greater usability by the public for the device, whether it is used in a work environment, by a sports enthusiast, or by the elderly, or by children, the requirement that the user employ hand manipulation to operate the device is eliminated. The user therefore has the use of both hands to engage in the activity with which he is involved, and the device will continue to operate as a portable misting/cooling device.

OBJECTS AND ADVANTAGES

It is therefore the principal object of the present invention to provide an improved portable misting fan device of the type generally formed by a body having fan means for creating and moving an air stream, the body accommodating a reservoir for providing a fluid source, and a power source for driving the fan means and electrical means for driving the power source, wherein the device further includes a powered mist generator carried within the body, driving means associated with the mist generator for driving the mist generator, actuator means for actuating the driving means and in turn actuating the mist generator, and a nozzle to receive a fluid mist from the mist generator and direct the mist into the air stream created by the fan.

In connection with the preceding object, it is a further object of the present invention to provide an improved portable misting fan wherein the mist generator is formed by a pump, the pump having motor means associated therewith, a misting nozzle carried on the body and having a fluid tube interconnecting the nozzle with the pump, and a motor actuator for actuating the motor to initiate fluid misting.

A further object of the present invention is to provide an improved portable misting fan of the type set forth above wherein the motor means for driving the pump is comprised of the power source that also drives the fan means whereby the same power source drives both the pump and the fan means in response to an actuating device.

Another object of the present invention is to provide an improved portable misting fan of the type described wherein the fluid nozzle from which the mist emanates may be positioned either forwardly of the fan means such that misting fluid is expelled into the air stream path forward of the fan, or the misting nozzle may be carried on the body positioned such that the misting fluid is expelled to the rear of the fan means thereby to allow misting fluid to be drawn into the air stream created by the fan means, or the mist may be introduced peripherally into the air stream.

A further object of the present invention is to provide a portable misting fan of the type described wherein the body has a lower end accommodating a removable reservoir in order to accommodate the filling of the reservoir, and the reinsertion of the reservoir at the backend of the device and having a fluid connection such that once the reservoir is reinstalled in the device, fluid communication is reestablished with a fluid tube supplying the mist generator.

In conjunction with the preceding objects, it is a further object of the present invention to provide an improved portable misting fan of the type described which may include the actuator means formed by a three position switch having a first off position, a second position which activates only the fan means, and a third position which activates the fan means and the pump whereby the misting device may be used as a fan device alone, or as a misting device.

A further object of the present invention is to provide an improved portable misting device which includes a powered mist generator consisting of an aspirator nozzle which draws water from an on-board fluid reservoir and wherein the device includes a motor driven air pump thereby to provide atomized water and air through the aspirator nozzle.

In conjunction with the foregoing object, a further object is to provide an improved portable misting device of the type described above, wherein fan means are provided and the aspirator nozzle delivers the created mist into the air stream created by the fan means.

Further objects and advantages of the present invention, as well as the various modifications and variations therein, will be better understood by reference of the following specification taken in conjunction with the drawings set forth herein below.

SUMMARY OF THE INVENTION

In summary, the present invention provides an improved portable misting fan unit of the type typically formed by a body having fan means at one end, and a reservoir at the other end, which further includes a powered misting generator therein, the mist generator being in fluid communication with the fluid reservoir and having an opposed end for providing fluid communication to a nozzle positioned to expel misted fluid in the air stream created by the fan means. The mist generator includes a motor for operating the mist generator that in turn is driven by electrical means. The motor that drives the mist generator may either be the same as that which drives the fan device, or may be a separate motor for driving the mist generator independently of the fan. The mist generator may take various formats, and following below, the specification will detail the various formats that the mist generator may assume.

The powered mister of the present invention may operate via an aspirator type nozzle or a conventional spray nozzle. The aspirator type nozzle will draw water from a low or medium pressure reservoir and require a motor driven air pump to drive the aspirator and charge the reservoir accordingly. The conventional spray nozzle is driven by the output of a high pressure water pump which pressurizes the water drawn from the reservoir. The thrust of the present invention is, therefore, to provide a powered misting device that will mist the fluid and direct the same into the air stream which usually includes a fan device for directing the air stream with the misted fluid therein toward the user.

An alternative embodiment would include a powered misting device which eliminates the fan but directs the misted fluid toward the user for providing a cooling effect.

The various embodiments forming the basis of the present invention will be described more fully in the accompanying drawings.

The above drawings are described in conjunction with the following specification herein below in order to illustrate the advantageous features of the present invention.

DETAILED DESCRIPTION OF DRAWINGS

Figure 1:
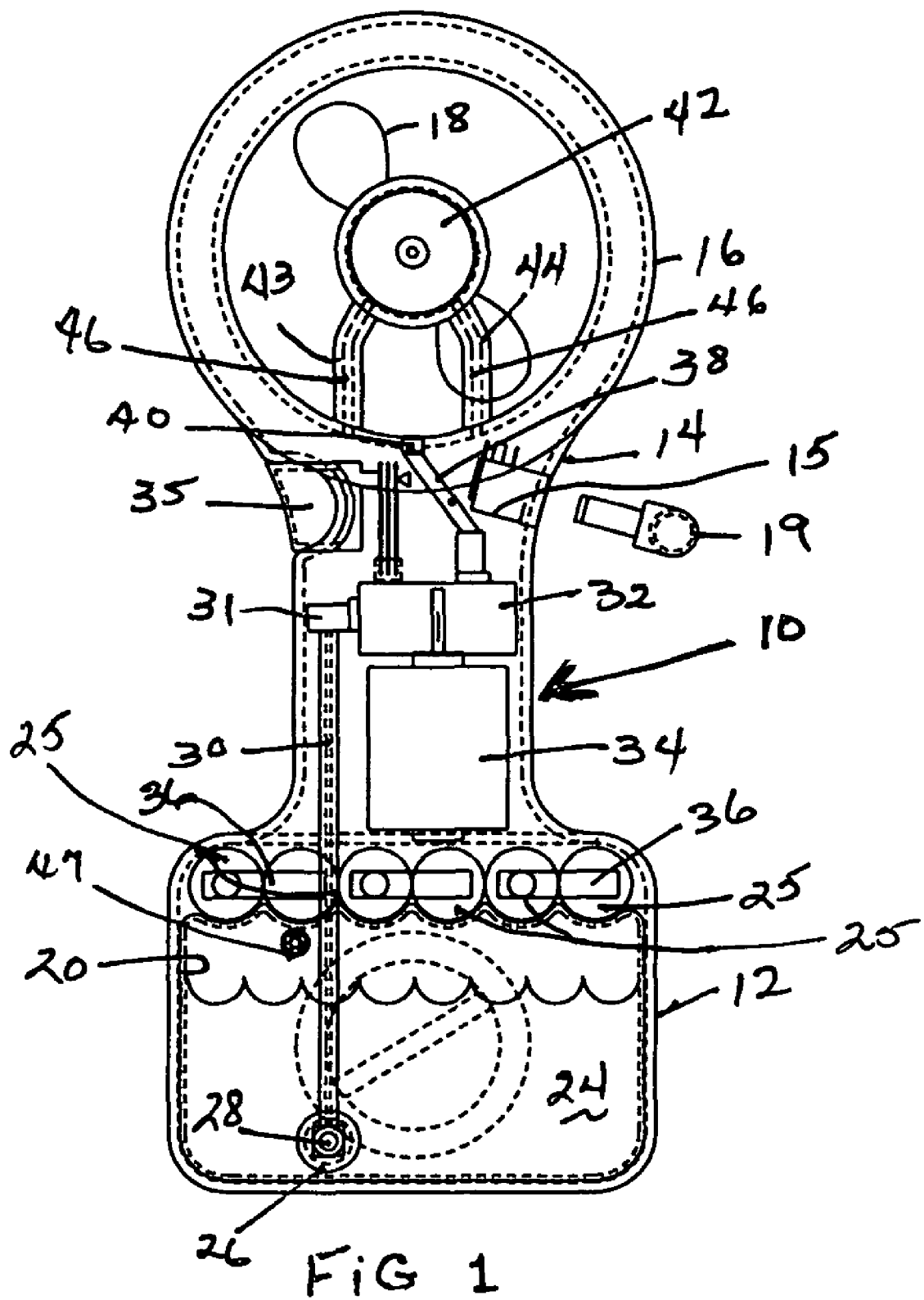
FIG. 1 is a front elevational view, in cross section, showing one embodiment of a continuous misting water misting fan having an onboard reservoir, and interconnections between the reservoir and the fan means for imparting a powered misting fluid into the air stream created by the fan means.
Figure 2:
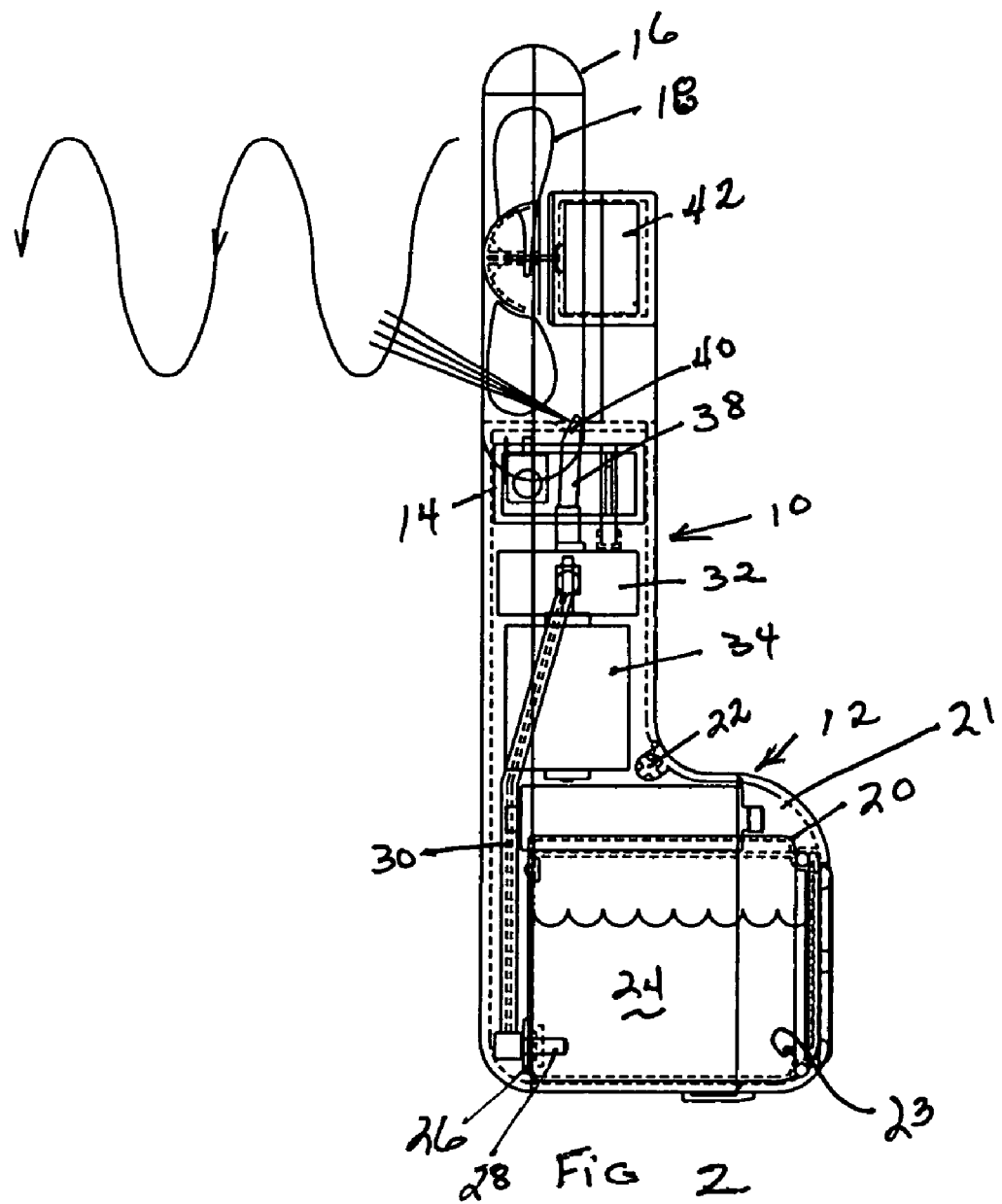
FIG. 2 is a side elevational view, in cross section, showing the misting fan of FIG. 1 and illustrating the orientation of the components thereof.
Figure 3:
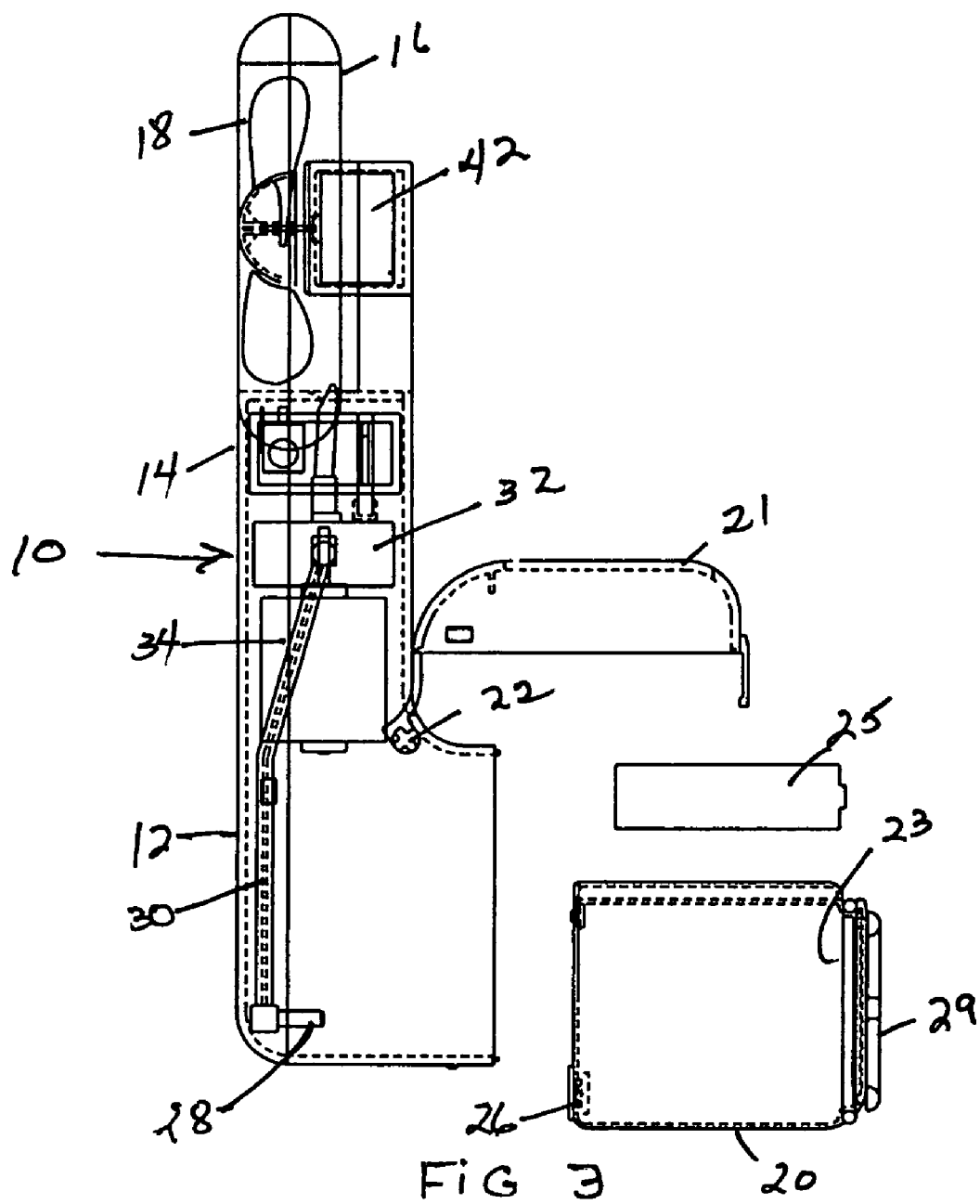
FIG. 3 is a side elevational view, in cross section, of the misting fan as shown in FIGS. 1 and 2, with the reservoir compartment opened, and the electrical power source removed and reservoir removed.

With reference to FIGS. 1 and 2 of the drawings, a first embodiment of the present invention is illustrated. The device is formed by main body 10 which is formed by a lower body position 12 and upper body 14. In this embodiment, the upper body portion 14 includes shroud 16 that, in this embodiment, assumes a circular configuration and encompasses the impeller or fan 18. The lower body portion 12 contains a reservoir 20 that, as illustrated in FIGS. 2 and 3 of the drawing is removable from the lower body portion 12. In this variation, the lower body portion 12 is shown to have rear lid 21 that is pivotally secured to the lower body portion 12 by means of a pivot pin 22. As shown, the reservoir contains a fluid source 24 that in the usual instance will consist of water. The electrical means for powering the devices consists of a plurality of batteries 25 that are positioned immediately above the reservoir 20, and are removable when the reservoir 20 is removed by pivotally moving the rear lid 21 in the upright position as shown in FIG. 3.

It will be observed from FIG. 1 that the batteries may be of the rechargeable type and in such event, body 10 may be provided with a port 15 to accommodate the plug of an adapter for recharging the batteries. As shown in FIG. 1, the adapter 19 may be inserted into the port 15 to recharge the rechargeable batteries 25 located in the device 10.

The reservoir is provided with a tube fitting aperture 26 which is designed to accept therein a tube fitting 28 in a fluid tight engagement. A dip tube 30 extends from the tube fitting 28 in order to feed fluid from the fluid source 24 to a pump 32. Dip tube 30 has, at its upper end, an appropriate fitting 31 which seats within the pump 32 such that upon activation as will be more fully described hereinafter, will feed fluid from the reservoir 20 to the pump 32. The pump is operated by means of a motor 34 that in turn is activated by an actuator button 35.

It will be observed from FIG. 1 of the drawings, that the lower body portion 12 includes battery contacts 36 positioned internally of the lower body section 12, which are, in turn, wired or electrically connected to the motor 34, and to the actuator button 35. It will be clear to those skilled in the art that upon depressing of the actuator button 35, electrical contact is established with the batteries thereby to actuate the motor 34, resulting in the pump 32 pumping fluid from the reservoir 20 upwardly therefrom.

The pump is further provided with a discharge tube 38 and terminates in a discharge nozzle 40.

The upper body portion 14, as previously indicated, supports the impeller or fan 18, which is powered by a fan motor 42, the fan motor being supported by means of a pair of support struts 43 and 44 respectively. In this variation, the fan motor 42 is powered by the batteries 25 by means of appropriate electrical conductors 46 which may be in the form of wires, or metallic strips. The electrical conductors 46 are concealed by positioning of same internally of the support struts as illustrated in FIG. 1 of the drawings. The actuator button 35 is similarly provided with a switch position for the fan motor 42 which may be the same position for actuating the pump motor 34 or may be a first position for operating the fan motor 42 independently of the pump motor 34. In this instance, the actuator button 35 may be a three position switch including an off position, a second position for actuating the fan motor 32 and third position for actuating the pump motor 34. Indeed, it is contemplated that it could be a four position switch including an off position, a fan motor on position, a pump on motor position, and a fourth position which would activate both the fan motor and the pump motor simultaneously. In such an instance, it is contemplated that the fan motor could be operated independently of the misting function of the device, or alternatively, the misting function could be operated independently of the fan function, and a final position would be the activation of both the pump motor as well as the fan motor to have misting fan device.

As illustrated in FIG. 3 of the drawings, the reservoir 20 is removable from the lower body portion 12, by lifting the rear lid 21 and pivoting the same upwardly, which removes the reservoir and also allows the operator to replace batteries when needed. As shown, the reservoir 20 includes a rear fill port 23 that is enclosed by a fill cap 29. The fill cap 29 is constructed so that it will sealingly engage the fill port 23 in a fluid sealing engagement. Hence, the operator may easily remove the reservoir 20 for refilling the fluid and inserting the same back into the lower body portion 12 of the device 10 for semi-continuous operation.

It will be appreciated that this embodiment, the impeller or fan blades are formed of a soft material to avoid injury to the user. The soft materials would include EVA foam rubber or other similar soft plastics, or other semi rigid soft materials that would avoid any injury to the user thereof.

It will also be appreciated from a view of FIGS. 1-3, as well as most of the other embodiments, the upper body portion 14 which supports the fan blades, fan motor, all surrounded by the shroud, and the lower body portion 12 which accommodates the reservoir, are in large sections of the device. The intermediate section has a narrower configuration and in most instances, provides a convenient grasping surface for the user to grasp and hold the device.

As shown in FIGS. 1 and 2 of the drawings, the discharge nozzle 40 is positioned in order to emit a misting spray into the air stream created by the impellers 18. It will be appreciated that the nozzle may be located at the lower portion of the shroud 16, or may be carried to the upper portion thereof by extending the discharge tube 38 through the shroud to the upper portion thereof and having the nozzle 40 spray the mist downwardly into the air stream created by the impeller 18. It has been determined that the device will operate quite well as a misting device regardless of whether the discharge nozzle 40 is positioned toward the bottom portion of the impeller 18, or positioned upwardly by extending the discharge tube 38 to upper portion of the shroud 16 and positioning the same above the impeller 18. Further, it has been determined that the discharge nozzle may be located either forward of the impeller 18, or rearward of the impeller 18, or peripherally of the impeller 18, so long as the misting can be effectively transported into the air stream created by the impeller 18. It is further contemplated that one could design a device without the impeller 18, and simply have a powered misting device that would simply impart a misted fluid to the user. It is believed, however, that by providing an impeller, and supplying a misted fluid to the air stream created by the impeller, regardless of whether the mist is provided below, above, forward of, behind, or peripherally of the impeller, a more efficient device is provided It will be further noted from FIG. 3 of the drawings, that the reservoir has an enlarged rear fill port, for the purpose of permitting the user to insert a mixture of ice and water into the reservoir 20. In this manner, the fluid is kept to a cool temperature, and further enhances the cooling and misting effect achieved by the device. The fill port cap 29 designed to sealingly engage the fill port 23 either by press fit, or a screw arrangement, or any other desired locking means. It is contemplated that the seal between the cap 29 and fill port 23 would be a fluid tight engagement in order to prevent leaking of fluid when the reservoir 20 is reinstalled into the device. It will further be noted that the tube fitting 28 is designed to seat within the tube fitting aperture 26 in a fluid tight arrangement, thereby allowing the reservoir to be totally removable from the device 10 for refilling purposes. The tube fitting aperture 26 would be appropriately gasketed such that upon removal, and for filling purposes, the tube fitting aperture 26 is sealed and will only accept the tube fitting 28 when the reservoir 20 is reinstalled into the device 10. Finally, it will be noted that the reservoir 20 is provided with a vent 47 that is covered by a flapper type seal or valve in order to allow air to back fill the reservoir as water is drawn out. This equalizes the pressure and will ensure that the device will continue to operate as fluid is withdrawn from the reservoir 20.

The description with respect to the remaining embodiments will, for ease of description, incorporate the same numbers for similar parts.

Figure 4:
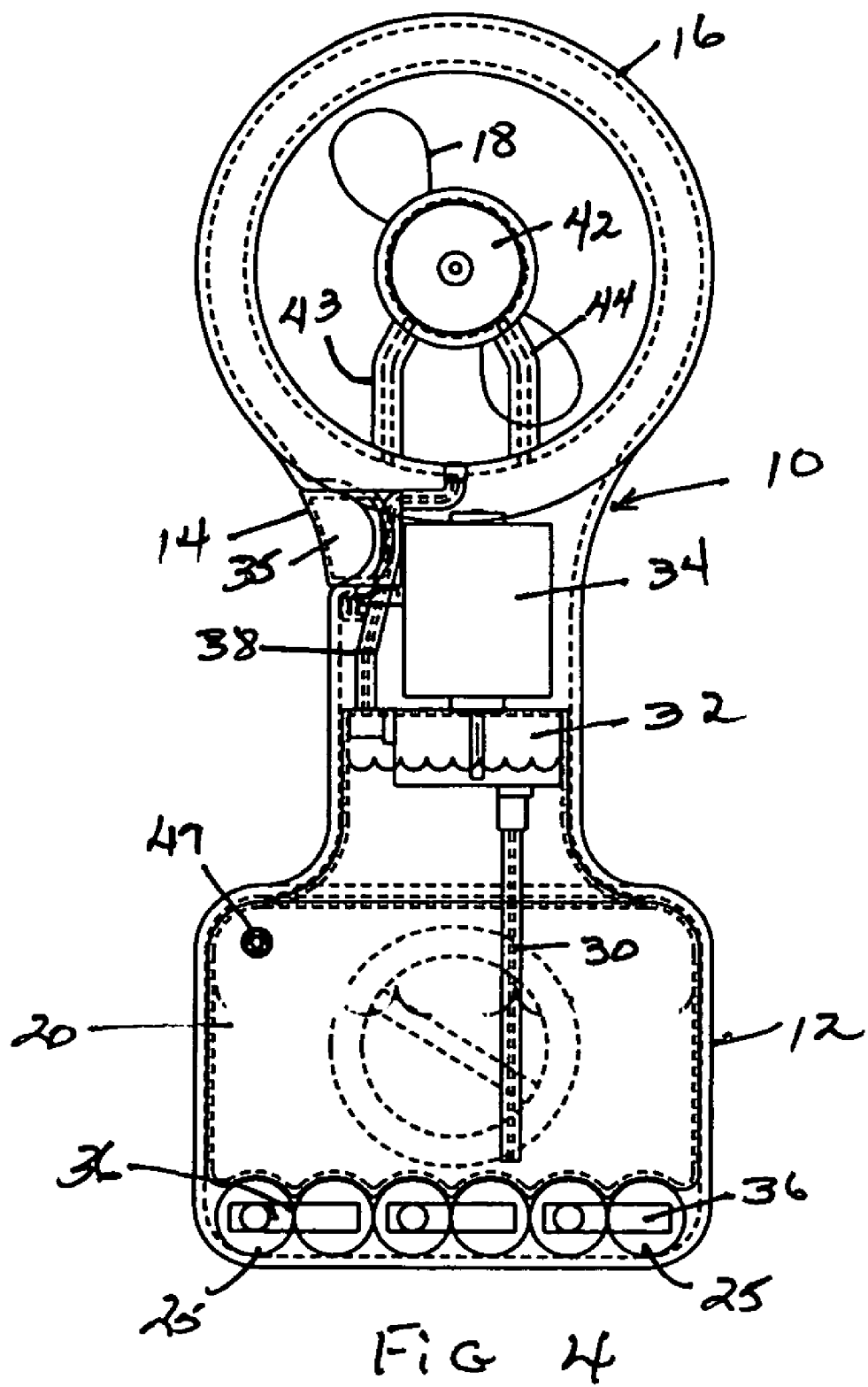
FIG. 4 is a front elevational view, in cross section, showing an altered form of the powered misting fan of the present invention, wherein the pump body for pumping the fluid from the reservoir is at least partially submersed in the reservoir.

With respect to FIG. 4, the device 10 is shown to be similarly constructed as with respect to FIGS. 1-3 of the drawings, with the exception that the parts are somewhat relocated in order to maximize the size of the reservoir to increase the fluid supply. As illustrated, the pump 32 is partially submersed in the reservoir 20, and hence, a portion of the narrower lower body 12 of the device 10 is utilized for the reservoir. The batteries 25 are relocated to the bottom portion of the device, and in this variation, access to the reservoir and the batteries would be by providing a rear lid pivotally secured to the device in order to remove the battery 25 and the reservoir 20 from the device.

Figure 5:
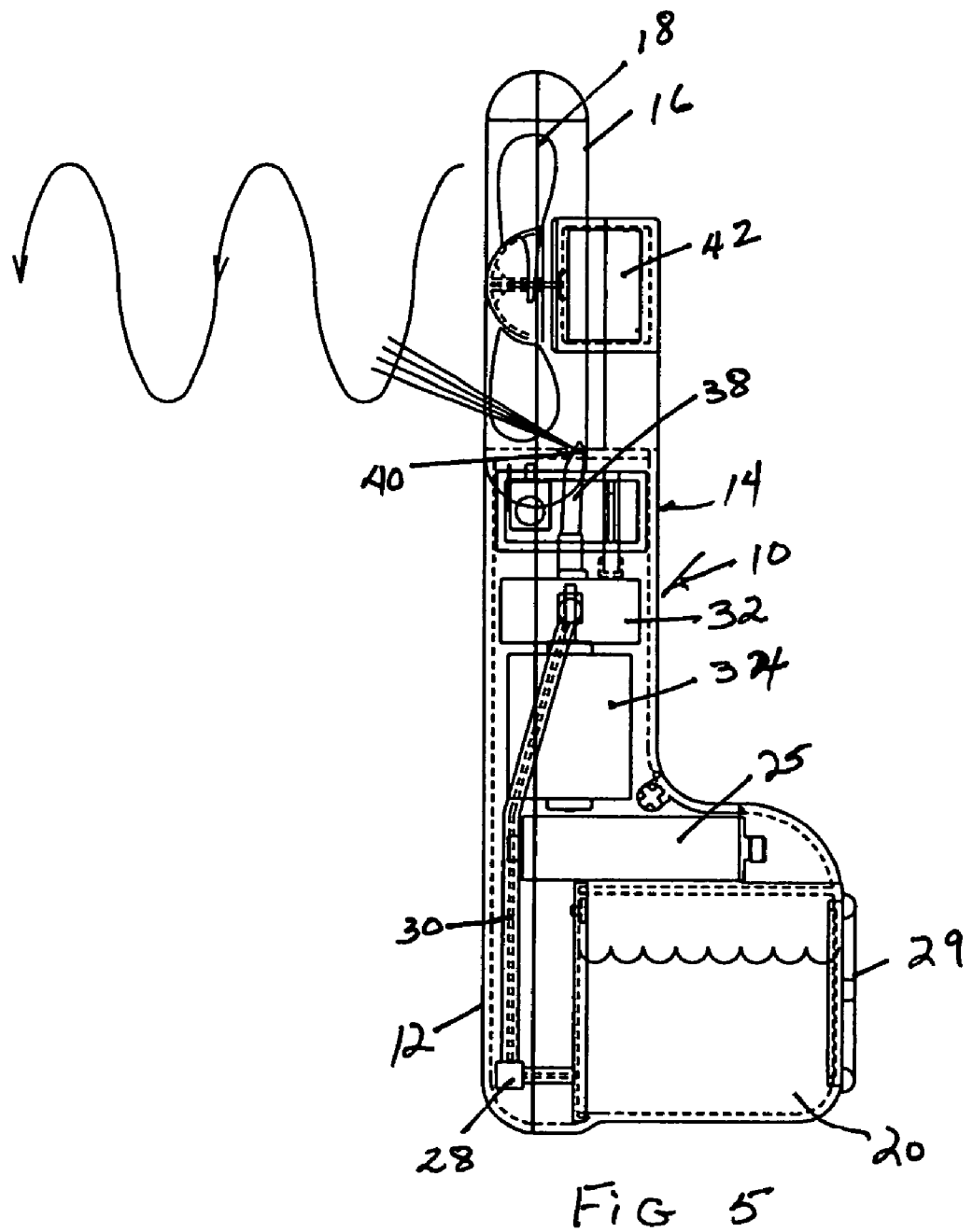
FIG. 5 is a side elevational view, in cross section, wherein the reservoir is formed into one half of the enclosure and is provided with a fill cap for filling the reservoir.

FIG. 5 shows a variation of the water misting fan wherein the reservoir is integrally formed to one half of the enclosure or lower body portion 12 of the device 10. The reservoir 20 is self-contained within the rear portion of the lower body of the device 10, and simply includes a fill cap 29 along the rear portion of the lower body section 12 in order to accommodate the filling of the device. In all other respects, the device would be the same as the variation shown in FIGS. 1-3 of the drawings, with the exception that the device could be molded as a unitary unit minimizing the number of welds or sections which would necessarily be glued or welded in order to form a water tight reservoir.

Figure 6:
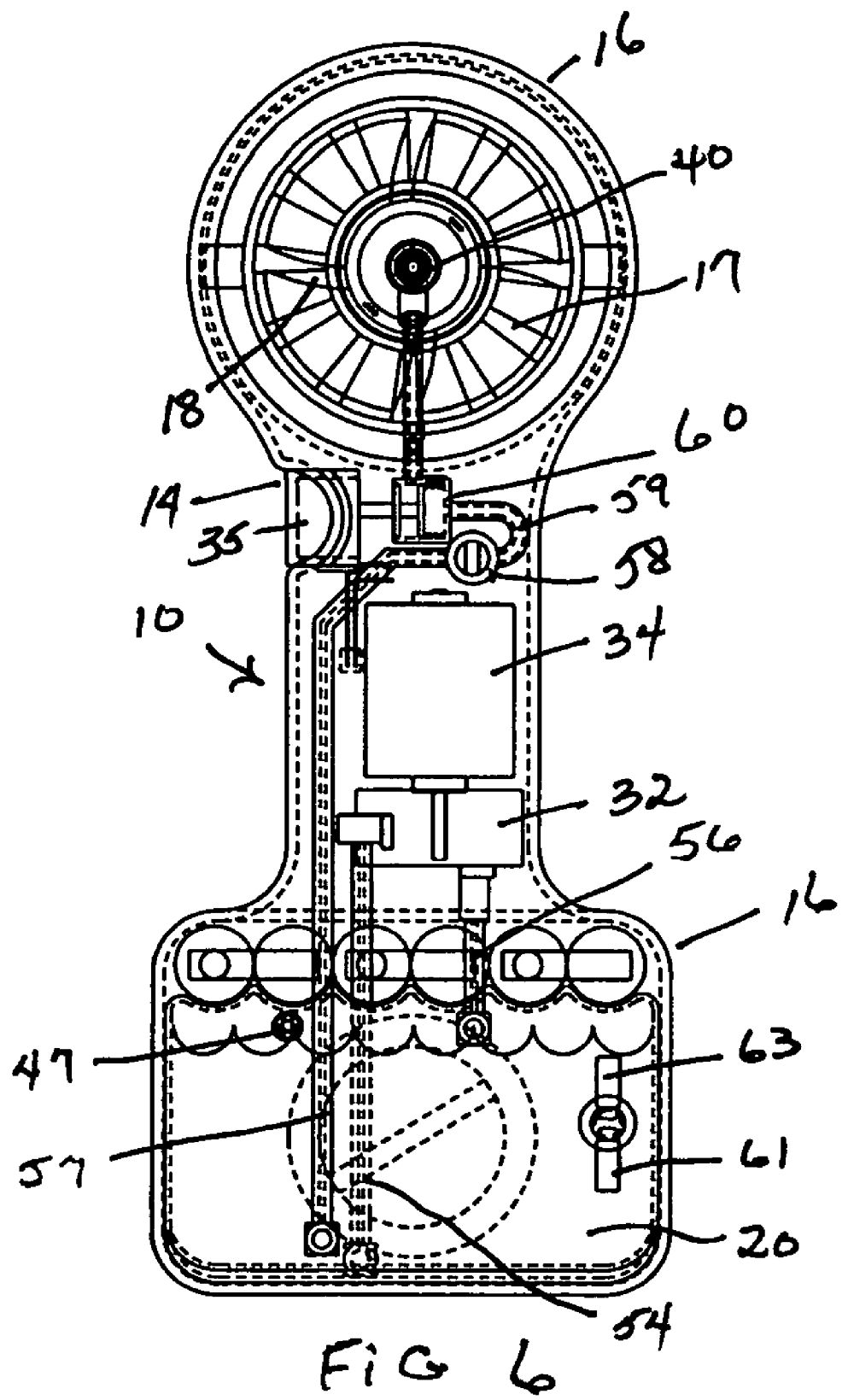
FIG. 6 is a front elevational view, in cross section, showing still a further embodiment of the present invention wherein pressurization means is provided for pressurizing the fluid in the reservoir that in turn will deliver pressurized misted fluid to the discharge nozzle.
Figure 7:
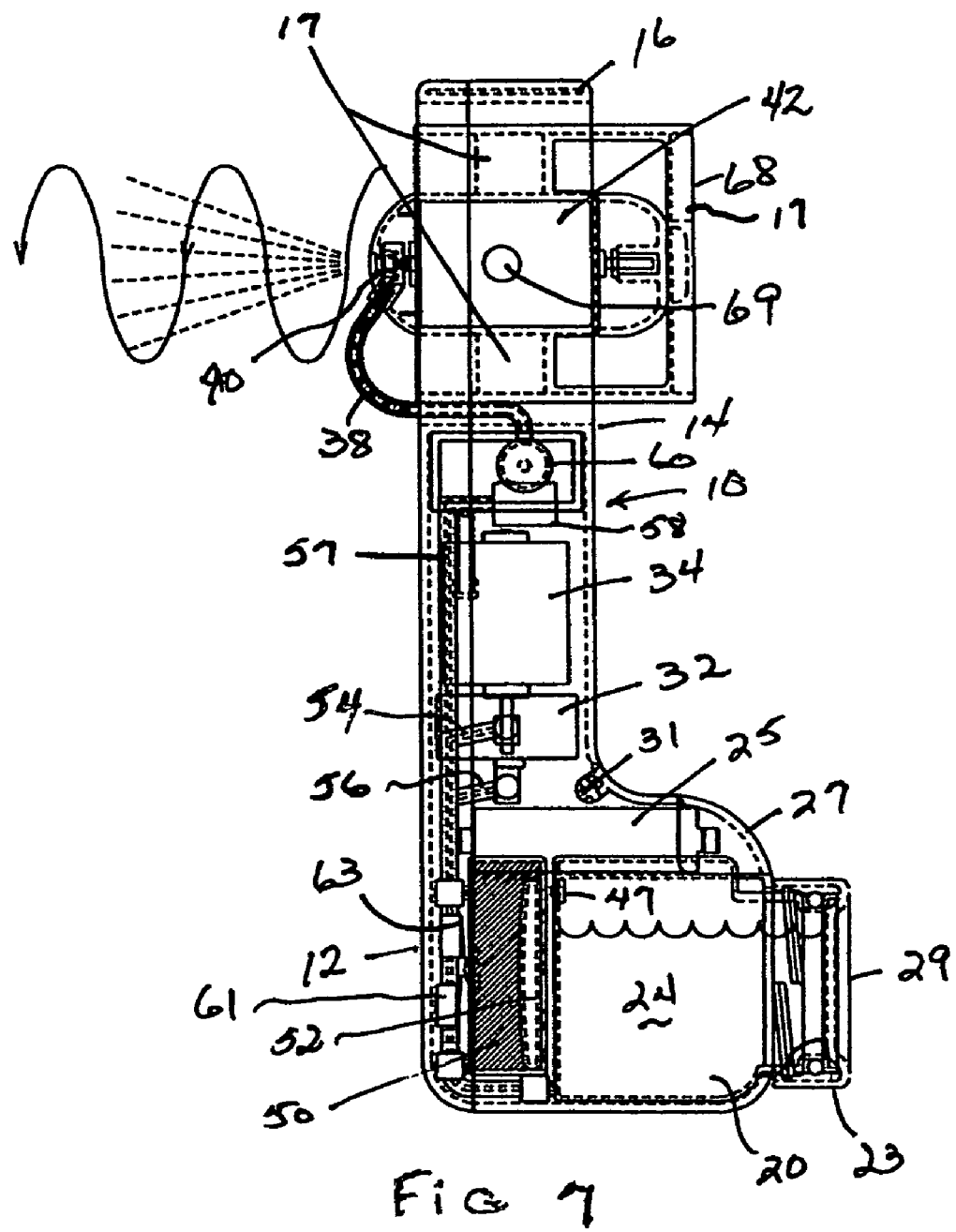
FIG. 7 is a side elevational view, in cross section, showing the water misting fan of FIG. 6.

FIGS. 6 and 7 shows still another variation or embodiment of the present invention. The device 10 is similarly configured with respect to FIGS. 1-3 of the drawings, but represents a more elaborate version thereof. With specific reference to FIGS. 7 and 8 of the drawings, we observe that there are two separate reservoirs including a low pressure reservoir 20 and high pressure reservoir 50. The high pressure reservoir 50 includes bladder 52 which is filled with air. The pump 32 includes a pump inlet tube 54 and permits the pump 32 to draw fluid from the low pressure reservoir 20 and pump it into the high pressure reservoir 50 through the pump discharge tube 56. The high pressure reservoir 50 includes a high pressure supply tube 57 which conveys the water to a pressure regulator 58 which, in turn, is connected to a valve 60 via supply tube 59. The pressure regulator 58 operates to maintain a constant water pressure as the device 10 is operated. This would be necessary in view of the fact that the high pressure reservoir will drop in pressure as the high pressure reservoir drains through the use of the device. Hence, the pressure regulator 58 will maintain a constant pressure or output pressure as the fluid is being drawn from the high pressure reservoir 50. A valve 60 may take the form of a spool valve and is in turn, connected to the discharge nozzle 40 by means of the discharge tube 38.

It will be observed in this variation that the discharge nozzle 40 is situated forwardly of the impeller 18 hence supplying the misted fluid forwardly of the impeller. It will further be observed from a view of FIG. 6 of the drawings that the impellers in this case are rigid impellers, in order to achieve a higher speed. The impellers are protected from the user by means of the grille 17 carried by the casing 68 both forward and rearward of the impeller blades 18. This will prevent injury to the user thereof since a rigid high speed impeller blades 18 are employed. The advantage that the rigid blades 18 provide is that they can achieve a higher RPMs, and therefore enhance the misting effects of the device. In this variation, it is contemplated that pressure switches may be employed to monitor and to control the pump depending upon the pressure. With specific reference to FIG. 7 of the drawing, a high pressure switch 61 monitors the state of the high pressure reservoir and will turn off the pump when the pressure reaches a certain high set point. A low pressure switch 63 is positioned to monitor pressures so that the switch will turn on the pump when the pressure drops below a certain set point. It will therefore be appreciated that the pressure may be regulated by means of the switches that control pump 32 that supplies the fluid to the pressure regulator 58 in order to maintain a constant pressure with a certain range.

The reservoir 20 also includes a fill cap 29 that seals a rear fill port 23 in order to permit the user to fill the reservoir 20 with fluid. As previously indicated, the fill port 23 is sufficiently large to allow both water and ice to be inserted within the reservoir 20. It will be appreciated from FIG. 7 that the pump 32 again is provided with a pump inlet tube 54 which receives water from the low pressure reservoir 20, and a pump discharge tube 56 which supplies the high pressure reservoir 50 to supply tube 57 supplying the pressure regulator 58.

Figure 8:
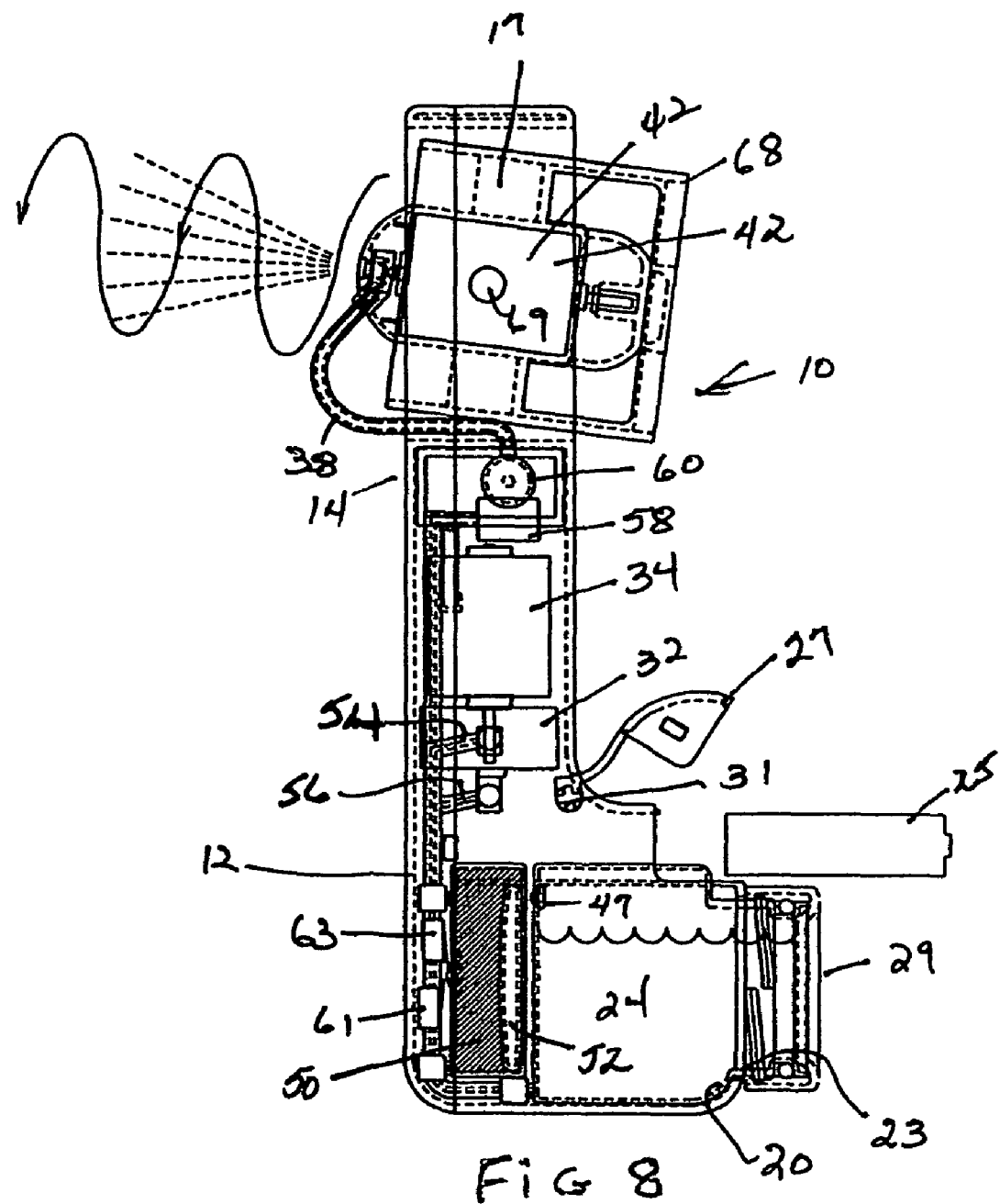
FIG. 8 is a side elevational view, in cross section, which shows a variation of the power misting fan of the present invention, wherein the fan module may be mounted in a pivoted fashion to facilitate the direction of the air stream, and wherein the battery compartment is readily accessible to remove the battery for replacement.

A further improvement may consist of having the impeller 18 and the fan motor 42 contained within a casing 68 that is pivotally secured to the shroud 16 by means of pivots 69. As shown in FIG. 8 of the drawings, the casing may be pivoted to change the direction of the air stream created by the impeller 18 and the discharge nozzle 40. FIG. 8 further illustrates the positioning of the batteries 25 relative to the device 10, and it illustrates that the batteries are removable by means of battery lid 27 pivotally secured to the lower body portion 12 by an appropriate pivot 31. It will be appreciated from a view of FIGS. 7 and 8 that the reservoir 20 is not removable from the device 10, but rather, includes a fill port and fill cap 29 for filling purposes. The batteries 25, however, are easily replaceable via the battery lid 27 to gain access to the battery compartment.

Figure 9:
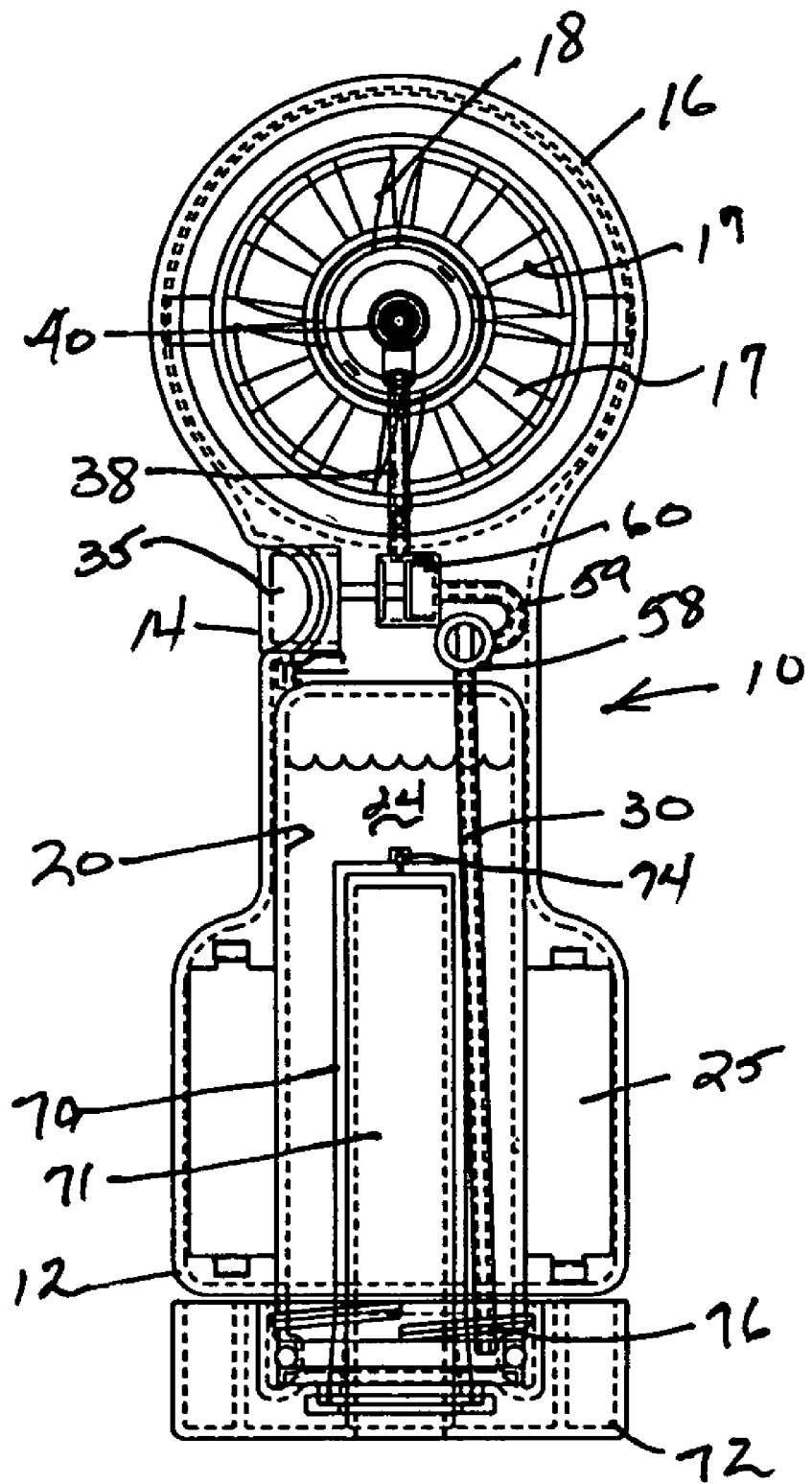
FIG. 9 illustrates still a further embodiment of the powered misting fan of the present invention which include a manually operated piston for pressurizing water from the fluid reservoir in preparation for delivery to a discharge nozzle for discharging the misted fluid into the air stream created by a fan or impeller.
Figure 10:
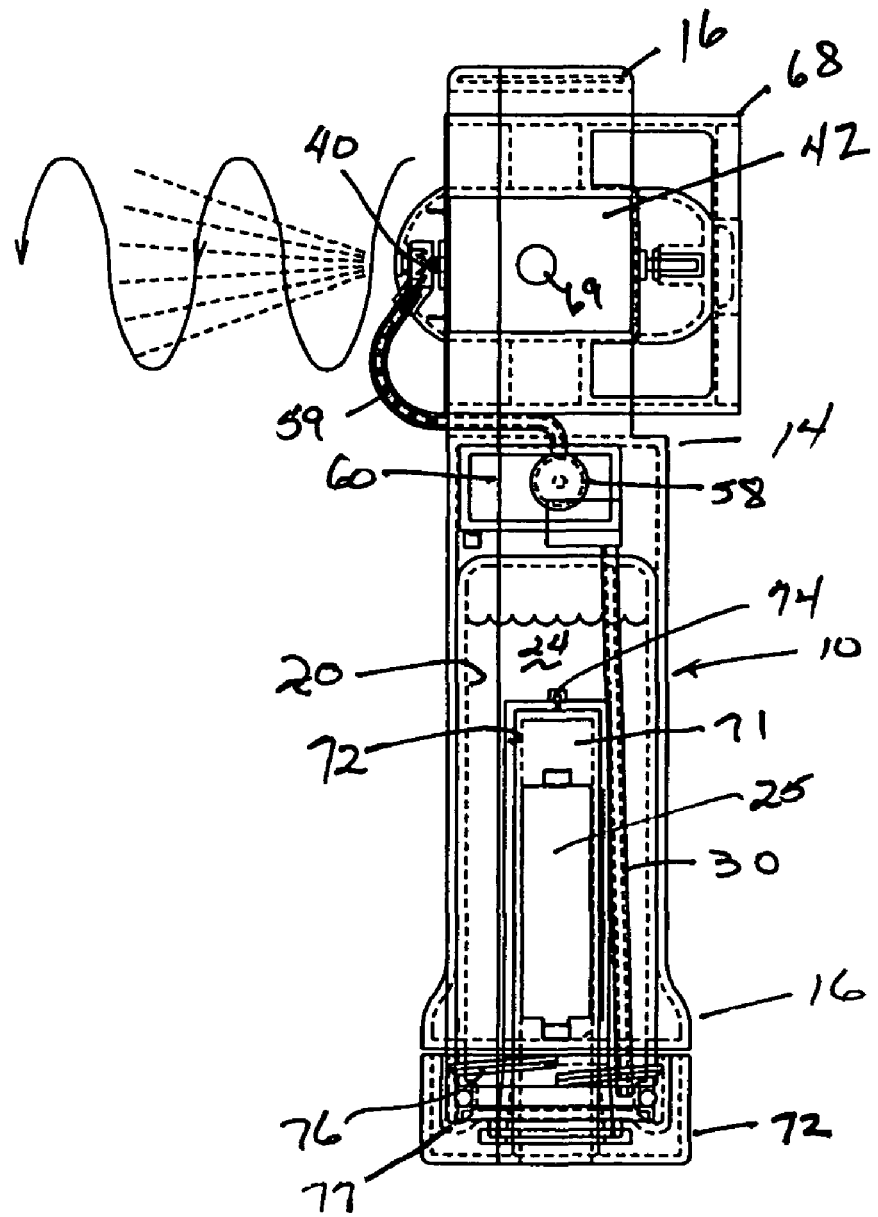
FIG. 10 is a side elevational view, in cross section, of the misting fan as shown in FIG. 9.
Figure 11:
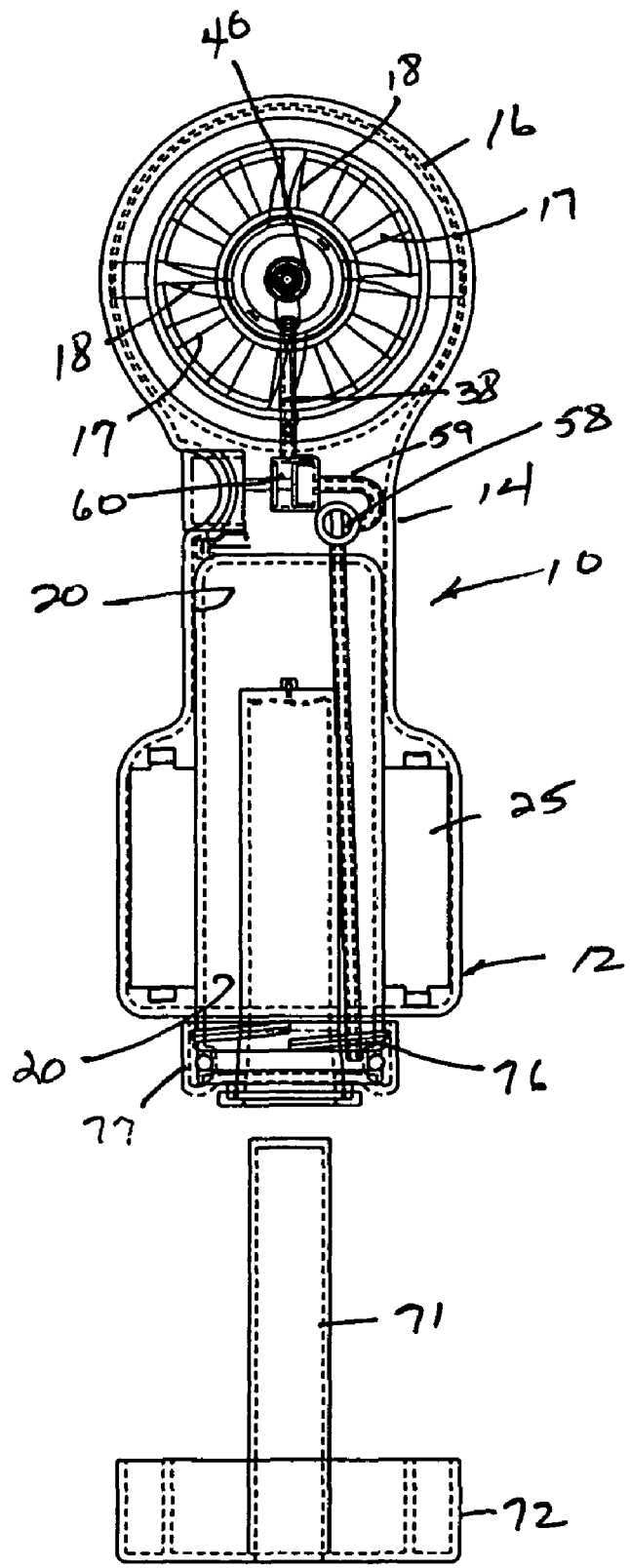
FIG. 11 is a partially exploded view showing the device of FIGS. 9 and 10, wherein a manually actuated pump is employed for pressurizing the fluid for misting purposes, with the pump piston withdrawn for illustration purposes.

FIGS. 9, 10 and 11 illustrate a further embodiment of the present invention which provides continuous misting for the fan operation without providing a pump motor or electrical means therefore. This variation illustrates that the device may be provided with a manual pump consisting of a pump cylinder 70 that accommodates a pump piston 71 therein. The operator will manipulate the pump piston by grasping the piston handle 72 to retract the pump piston 71 from the pump cylinder 70. A check valve 74 is employed in the pump cylinder such when the pump piston 71 is inserted into the pump cylinder, air is forced into the reservoir 20 to pressurize the fluid source 24 therein. When the pump piston is withdrawn from the pump cylinder, the check valve prevents air from escaping back into the cylinder. As illustrated, the dip tube 30 supplies fluid from the reservoir 20 to the pressure regulator 58 that in turn supplies the valve 60 via the supply tube 59.

The user depresses the actuator button 35 to turn the fan on which is operated by means of the fan motor 42, which again, is supplied by electrical power via the batteries 25 and appropriate contacts interconnecting the fan motor 42 with the batteries 25 via the actuator button 35. The actuator button 35 would actually be a three position switch including an off position, a second position which turns on the fan motor 42, and third position which opens the valve 60 in order to provide a misted fluid to the discharge nozzle 40 supplied via the discharge tube 38. In this embodiment, once again the device shows the fan blades as being of a rigid material, in order to obtain a high speed situation. The fan blades 18 are therefore encased between the grilles 17 that are both forward and rearward of the casing 68 in order to protect the user from any injury. The fan or impeller 18 is mounted within a casing 68 that pivots on pivots 69 in order to direct the airflow as indicated previously with respect to embodiments 7 and 8 of the drawings. It will be observed that the pump cylinder 70 includes a pump cap 79 which is screw threaded to a threading 76 so that the pump cylinder 70 and cap 79 may be unscrewed from the lower body portion 12 and thereby allow access. The advantage of the embodiment as depicted in FIGS. 9 and 10 of the drawings is the fact that the device 10 may be quieter, have longer battery life and be more economically manufactured by eliminating a motorized pump and a pump motor with the accompanying contacts and electrical interconnections with the batteries and actuator button.

FIG. 11 illustrates the embodiment of FIGS. 9 and 10 showing the removal of the pump piston 71 and the piston handle 72 unit wherein access to the pump cap 79 and thereby access to the reservoir 20 may be gained.

Figure 12:
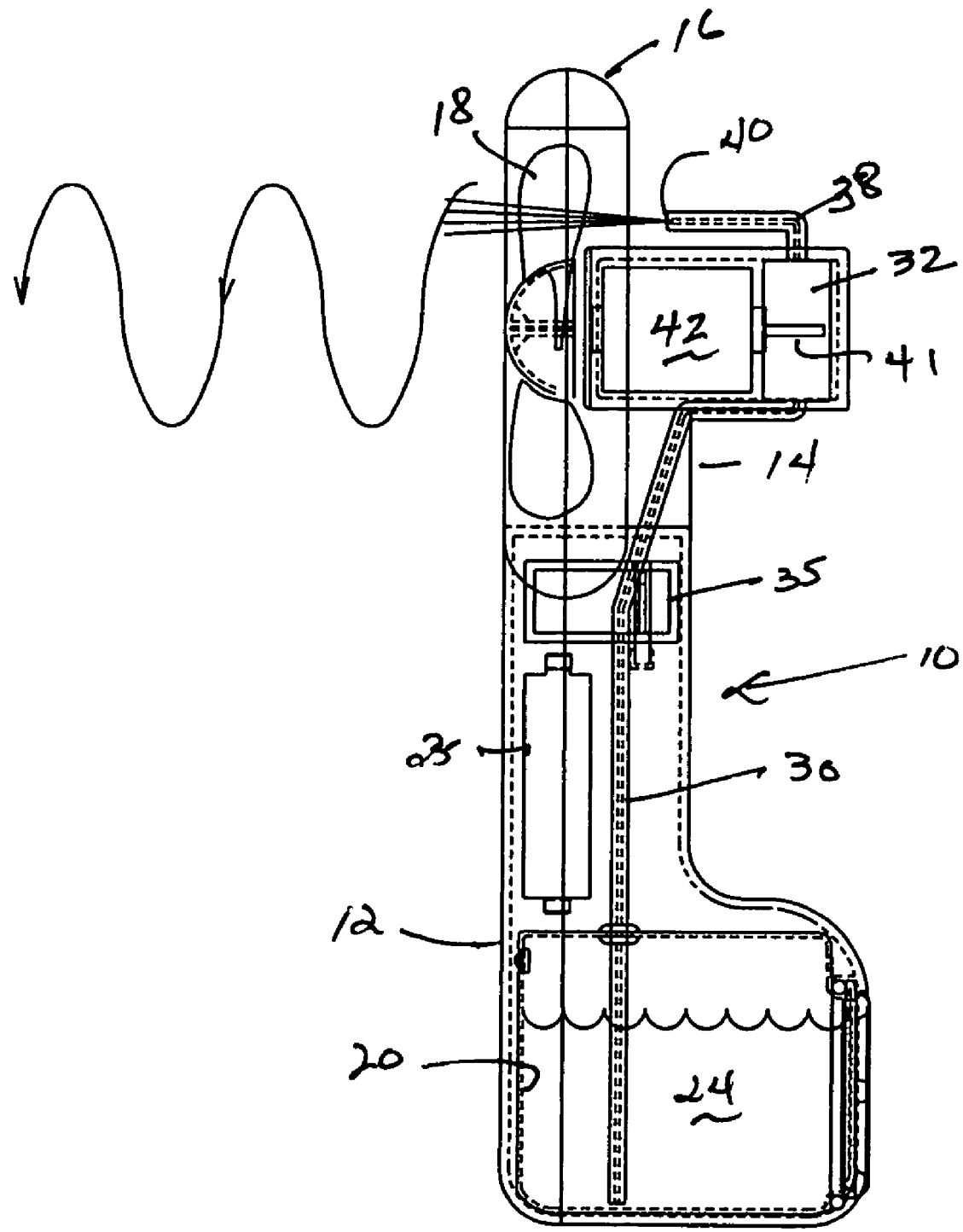
FIG. 12 is a side elevational view, in cross section, showing a variation of the misting fan as depicted in FIGS. 1 and 2 and the pump is operated from the same motor as the fan and illustrates the arrangement of the parts in order to accomplish the aforesaid purpose.

FIG. 12 illustrates a further embodiment and variation of device as illustrated previously in FIGS. 1-3 of the drawings. This embodiment illustrates the ability to use the same motor for both the fan 18 as well as the pump 32. It will be observed that the pump 32 is moved to a position immediately rearward of the fan motor 42 and is attached to the motor shaft 41 toward the rearward end of the motor 42. The impeller 18 is attached to the forward end of the motor 42 as previously described. The actuator button 35 is in electrical contact with the batteries 25 and with both the pump 32 and fan motor 42. It will be observed that in this variation, the discharge tube 38 emanating from the pump 32 may be easily positioned with the discharge nozzle 40 located immediately rearward of the impeller 18, such that the misting fluid is provided into the air stream created by the impeller 18 rearward thereof. It is further contemplated that the pump may be provided with a gear assembly so that upon actuation of the pump 32 and fan motor 42 by the actuator button 35, the pump operating speed will compliment the fan speed. The advantage of the embodiment as illustrated in FIG. 12 is the fact that one may still have a pressurized fluid source operated electrically via a pump and a motor, as well as a fan operated by a motor, with the efficiency being that the same motor is used for both the fan and the pump. This eliminates duplication of a motor, with the result that the cost of parts is reduced while achieving the same result.

Figure 13:
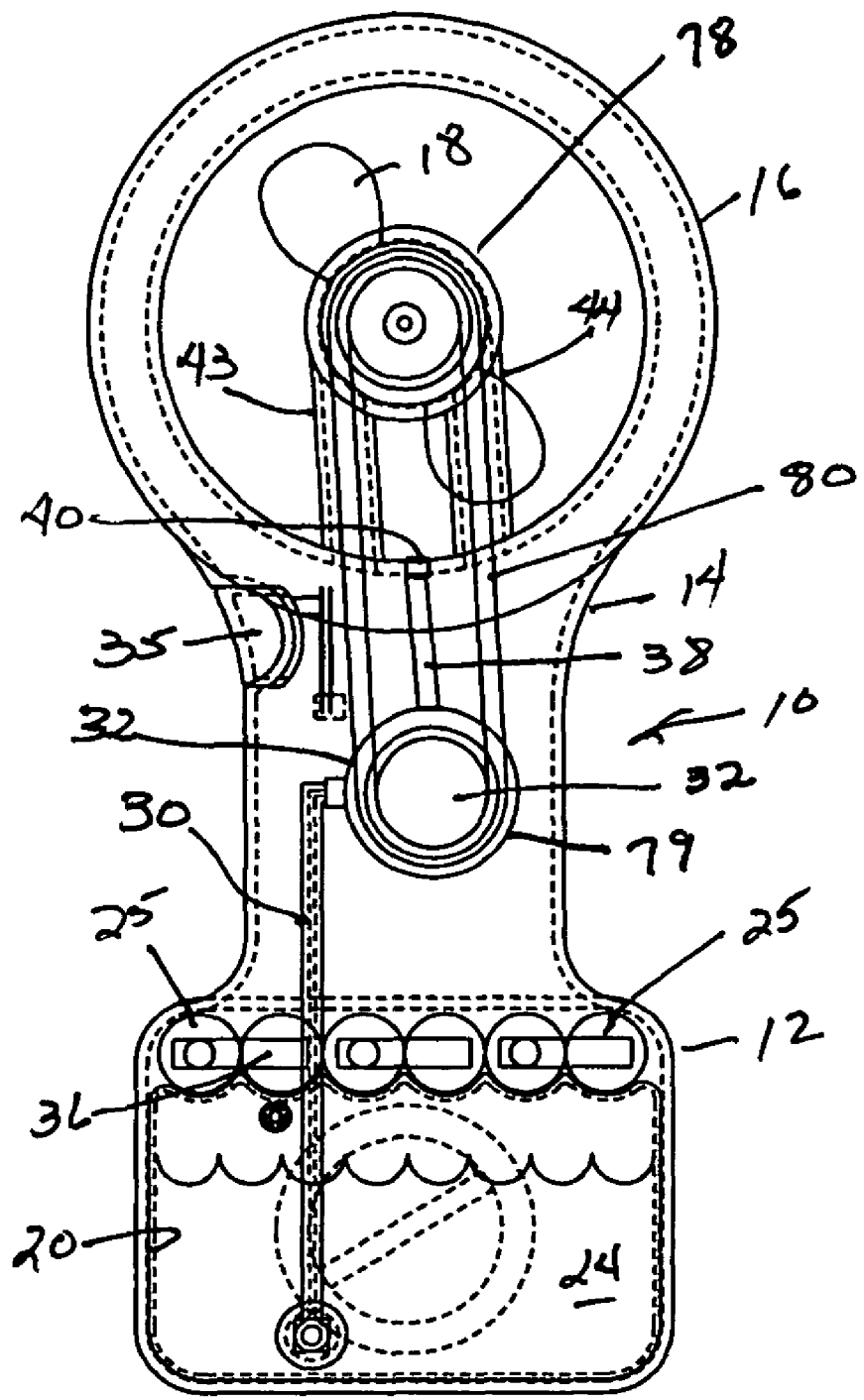
FIG. 13 is still another variation of the powered misting fan of the present invention wherein the motor drives a belt and pulley system for driving the pump within the enclosure.
Figure 14:
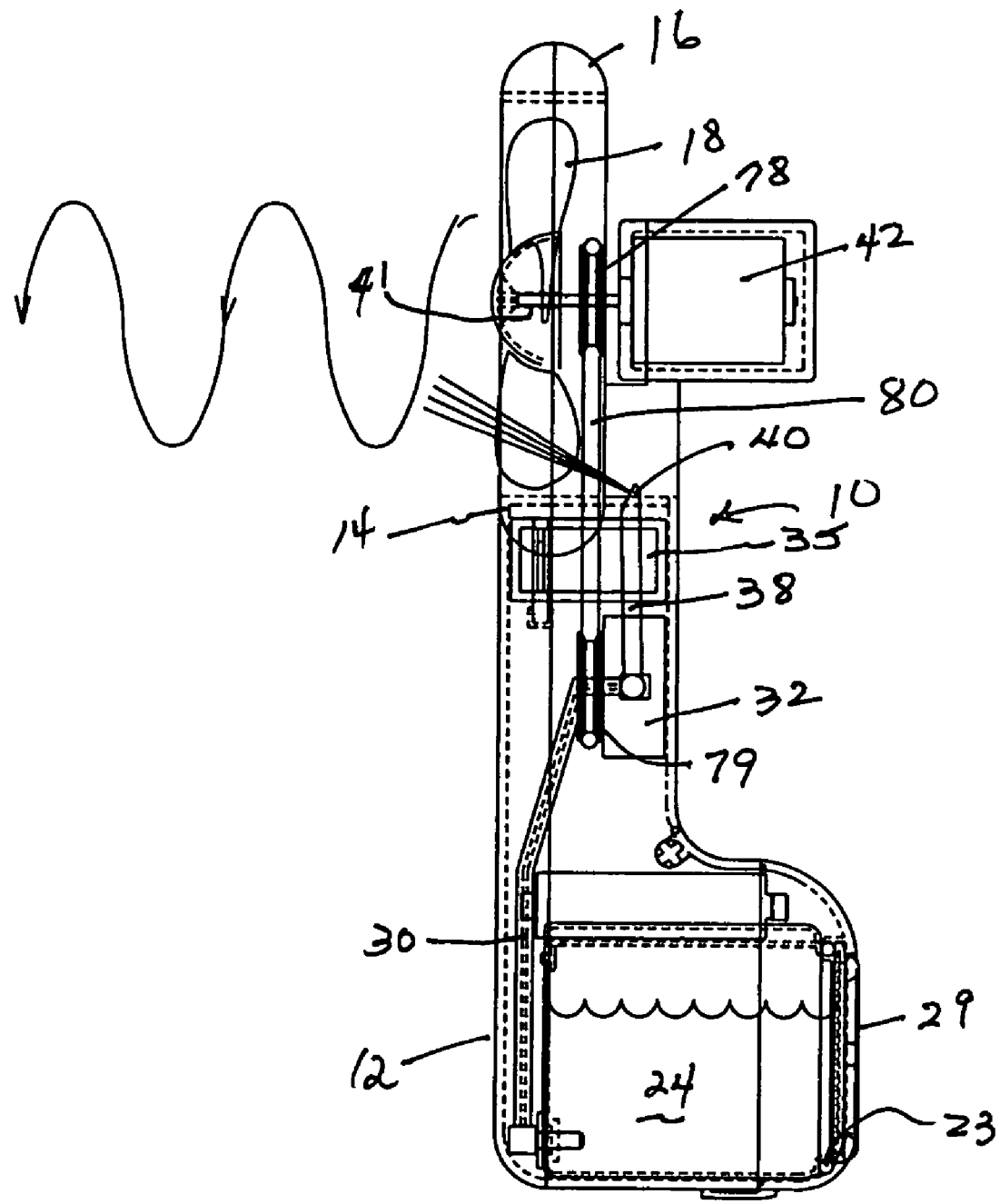
FIG. 14 is a side elevational view, in cross section, illustrating the arrangement of the parts of the pressurized misting fan as shown in FIG. 13.

FIGS. 13 and 14 illustrates still a further possible embodiment of the present invention wherein pressurized fluid is supplied to a fan device in order to provide a portable misting fan device. The import of FIGS. 13 and 14 is to show another variation of operating the pump with a single motor, however, in this instance, the motor drives a belt and pulley arrangement for operating the pump to supply fluid from the reservoir to the discharge nozzle 40. The motor 42 is shown to have a motor shaft 41 that has the impeller 18 mounted at the forward end, and also has an upper pulley 78 mounted thereon. A lower pulley 79 is mounted to the pump body 32, and a drive belt 80, respectively, drives the pulleys 78 and 79. It will be appreciated that once the motor 42 is activated by the actuator button 35, the motor shaft 41 will drive the two pulleys 78 and 79 as well as the impeller 18. The pulleys 78 and 79 driven by the drive belt 80 thereby activate the pump 32 to pump fluid from the reservoir 20 via the dip tube 30 into the pump, and from the pump to the discharge tube 38 and to the discharge nozzle 40. The discharge nozzle 40 is shown to be located rearward of the fan blades to the bottom portion thereof, but nevertheless provides a misted fluid to the air stream created by the impeller 18. This variation shows the motor 42 being supported by a pair of opposed motor support struts 43 and 44 respectively, which may take the form of a hollow configuration in order to accommodate the drive belt 80 within the confines thereof. This conceals the drive belt 80 from view, and protects the user from any contact with the drive belt 80.

Figure 15:
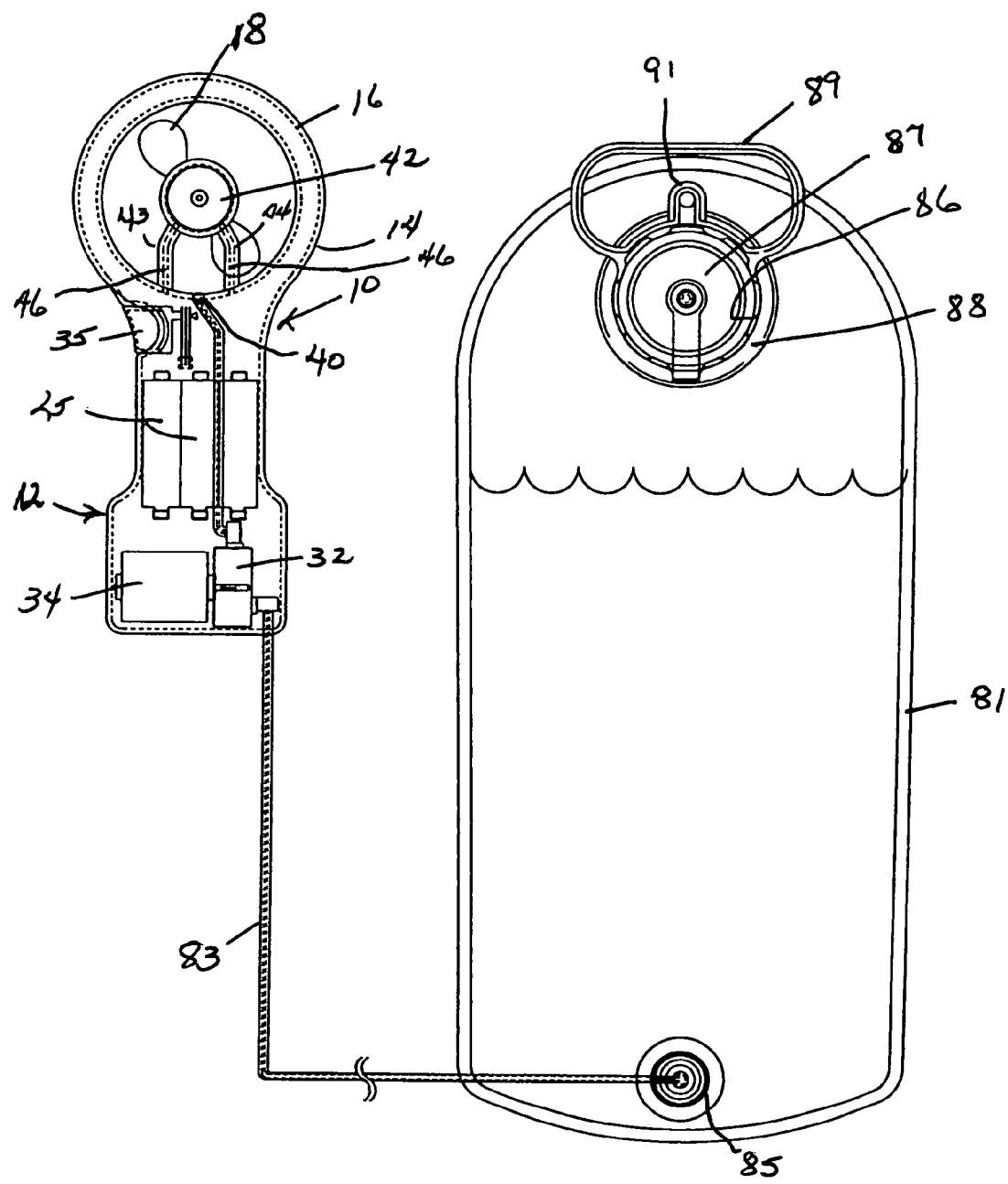
FIG. 15 is a front elevational view, in cross section, showing another variation of the misting fan of the present invention wherein the reservoir is removed from the enclosure and incorporated in a separate location and is provided with a low pressure supply line connecting the bladder or reservoir to the device.
Figure 16:
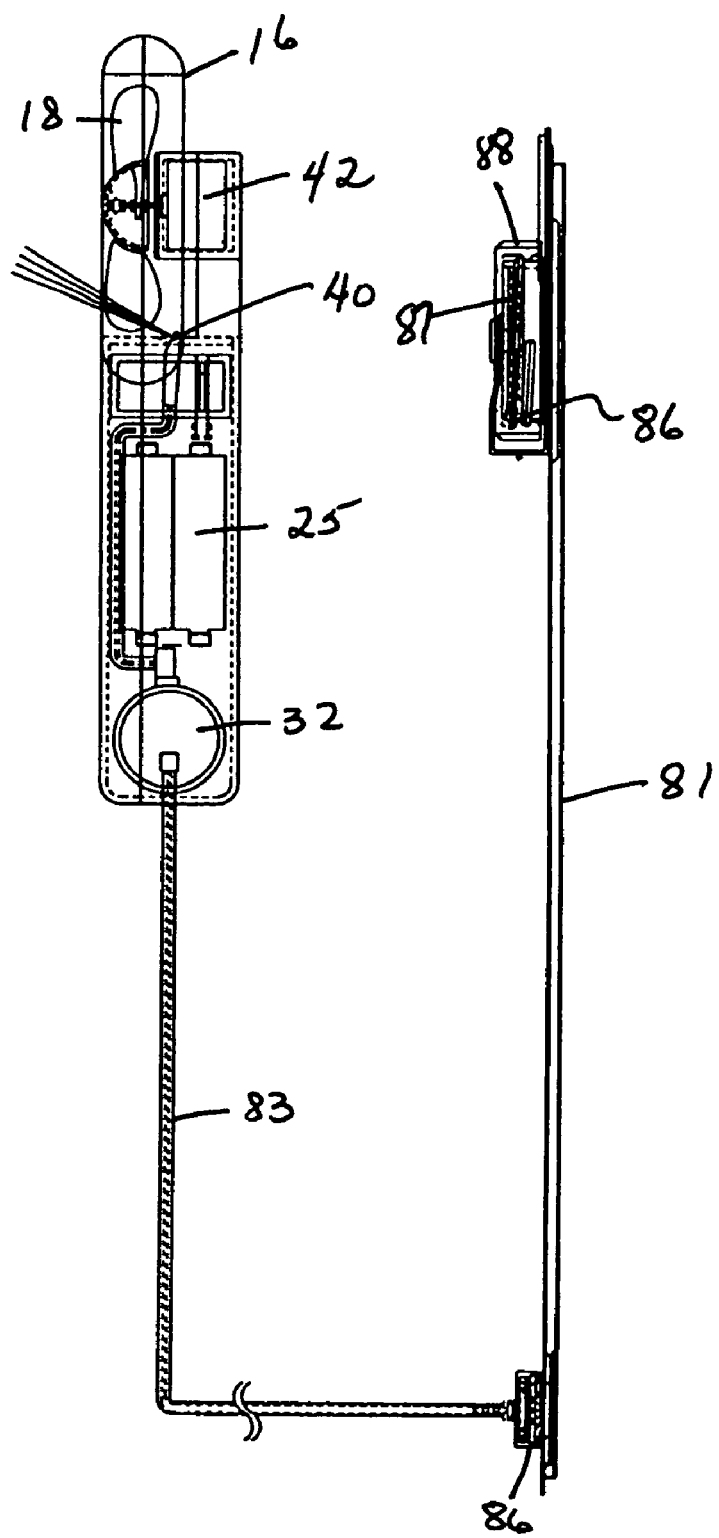
FIG. 16 is a side elevational view, in cross section, illustrating the device of FIG. 15 with the bladder in the unfilled status.

With reference to FIGS. 15 and 16, a still further variation of the present invention is illustrated. It will be observed in this variation, the main body 10 of the misting device can be reduced in size such that the lower body 12 accommodates the batteries 25, and the pump motor 34 and pump 32. The upper body 14 accommodates the shroud 16 which encircles the impeller or fan 18. A pair of opposed struts 43 and 44 supports the fan motor 42, wherein the electrical contacts 46 are located. In this variation, the reservoir now takes the form of a bladder 41 that is removed from the main body 10. It is contemplated that this variation is intended to encompass a device wherein the user would have a backpack into which the bladder 81 is fitted, such that the volume of water carried in the bladder 81 may be greatly enhanced. It will be observed that the pump 32 is interconnected to the bladder 81 by means of supply tube 83 that interconnects with the bladder 81 by means of a bladder fitting 85. The bladder fitting 85 is provided with a check valve that prevents any back flow liquid into the reservoir. The bladder 81 is filled by means of a fill port 86 that is enclosed by means of a fill cap 87 that engages the fill port 86 in any appropriate manner. As shown in FIG. 15, the fill port 86 may be surrounded by a fill collar fitting 88 that may be provided with internal threads for screwing the fill cap 87 into the fill port 86. The bladder handle 89 is provided which facilitates in removing and reinserting the bladder 81 into a backpack. A hanger 91 may be provided to permit the user to hang the bladder 81 incident to the filling operation for ease and convenience. In all other respects, the misting fan device as demonstrated in FIGS. 15 and 16 operates in the same manner as previously described with the exception of the reservoir in the form of a bladder 81 being removed from the main body portion of the device in order to greatly enhance the volume of water which may be carried by the user.

Figure 17:
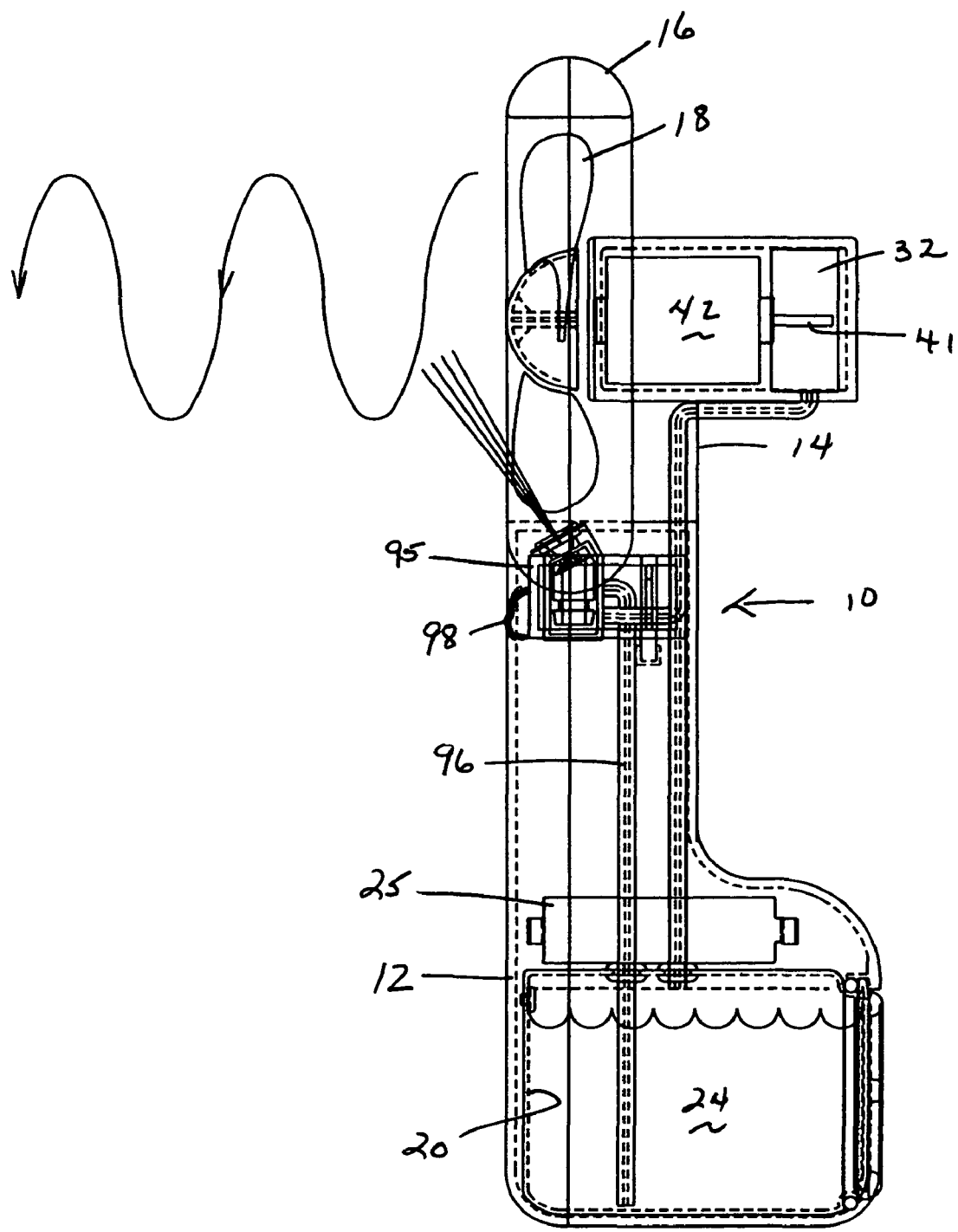
FIG. 17 is a side elevational view, in cross section, showing the hand held portable water misting fan of the present invention that incorporates an aspirator type nozzle for directing water droplets into the air stream created by the fan.

With reference to FIG. 17, still a further variation of the portable misting device of the present invention as illustrated. A variation as illustrated in FIG. 17 is similar to the embodiment as illustrated in FIG. 12, with the exception that the device of FIG. 17 is provided with an aspirator type nozzle. For ease of description, numerals indicating the parts that are in common will be maintained.

As illustrated in FIG. 17, the main body 10 is provided with a lower body portion 12 and an upper body portion 14. The upper body 14 includes the shroud 16 that envelops the impeller 18. The impeller is mounted on a motor shaft which extends out from the fan motor 42, while the motor shaft extends through the backside of the fan motor 42 in order to operate the air pump 32. The output from the air pump 32 is directed into an air supply tube 93 which connects to both the aspiration nozzle 95, and to the reservoir 20 in order to provide the reservoir 20 with a charge of pressure as needed. A separate water supply tube 96 extends from the reservoir 20 and connects with the aspirator nozzle 95. The operation of an aspirator nozzle is known in the art and basically operates by providing a stream of air driven into a narrow orifice. Ports are located at the sides of the orifice substantially transverse to the air path that connect to the water reservoir via the water supply tube 96, such that when air goes past the ports, the pressure is lowered at the orifice and the lower pressure draws water out from the reservoir by vacuum. Water gets atomized as it mixes with the turbulent air jet. The aspirator nozzle 95 disburses mist in the form of very fine droplets. Aspirator nozzle 95 may be operated by means of actuator 98 which would take the form of a switch as previously defined. It will also be observed in this variation that the same motor 42 will operate the impeller 18, as well as the air pump 32. This is conservative of space and expense by eliminating the need for a second motor to operate the pump.

Figure 18:
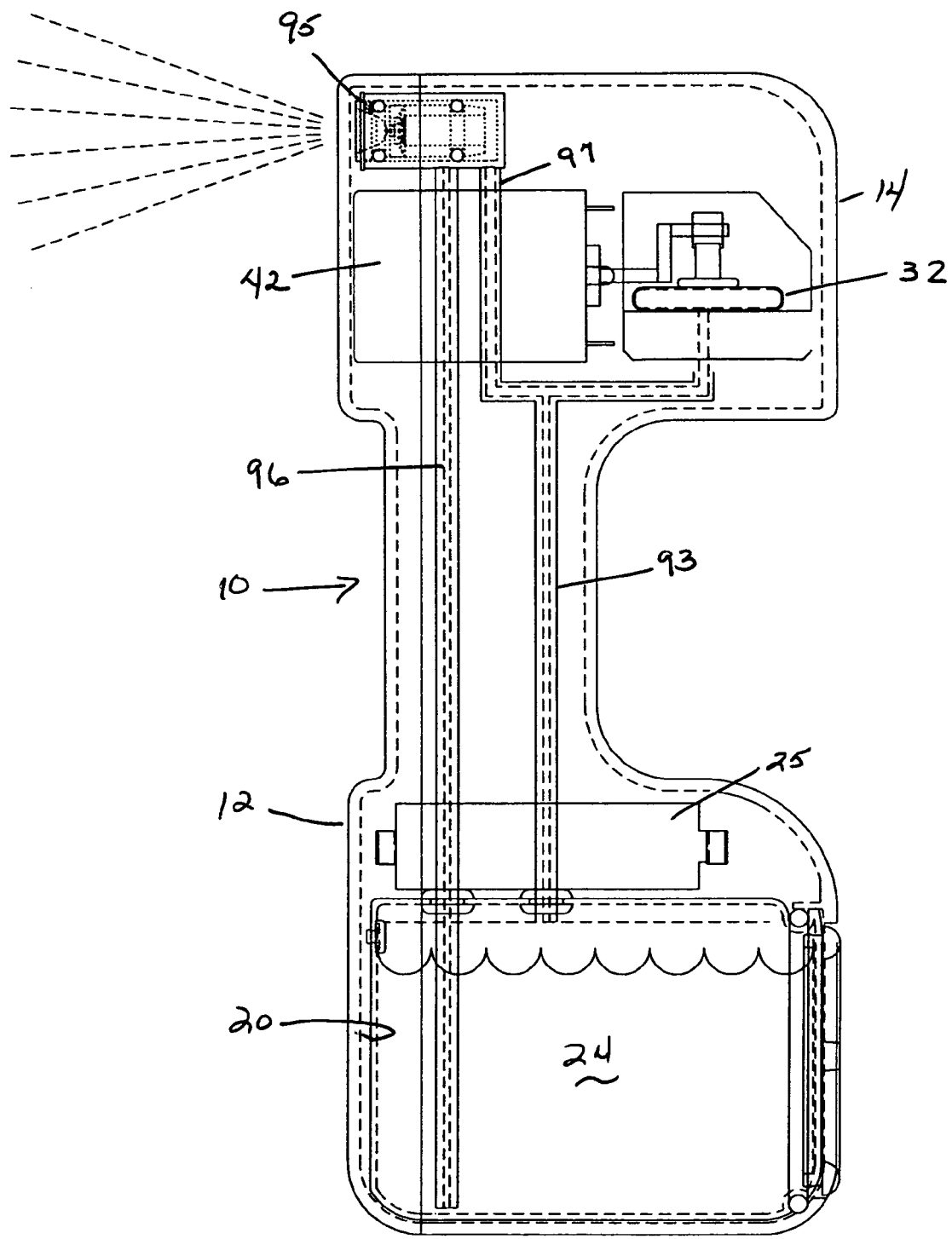
FIG. 18 is a side elevational view, in cross section, showing a water misting device of the type described herein wherein the misting is accomplished by means of an aspirator type nozzle, and eliminates the fan such that the fine mist of water droplets is directed directly to the user.

FIG. 18 illustrates still a further variation of a portable misting device in accordance with the present invention, the main difference between the embodiment of FIG. 18 and prior embodiments is elimination of the impeller. The device of FIG. 18 is shown to include a main body 10 having a lower body 12 and an upper body 14 the lower body 12 accommodating the reservoir 20 containing the fluid source 24 with an appropriate battery compartment accommodating the batteries 25. A water supply tube 96 extends from the reservoir 20 up to the aspirator nozzle 95. The upper body 14 encloses and houses the air pump 32 that is driven by motor 42. The air pump 32 provides pressurized air to pressurize the reservoir 20 via air supply tube 93 and also provides pressurized air to the aspirator nozzle 95 via supply tube 97. The water supply tube, as previously indicated, extends from the reservoir 20 upwardly and connects to an appropriate fitting in the aspirator nozzle 95. An actuator switch button (not shown) operates the device as previously indicated by establishing electrical contact between the batteries and the motor 42. Once actuated, the motor will operate the air pump 32 to provide a source of air to the aspirator nozzle 95, which includes a series of ports in fluid communication with the water supply tube 96. Once again, as air passes over the appropriate ports, the vacuum pressure created draws fluid into the aspirator nozzle that then delivers a stream of misted air toward the user to achieve the cooling effect. It will therefore be appreciated from this description that the device can eliminate the fan and simply be an air driven aspirator nozzle type device in order to provide the misting effect.

Figure 19:
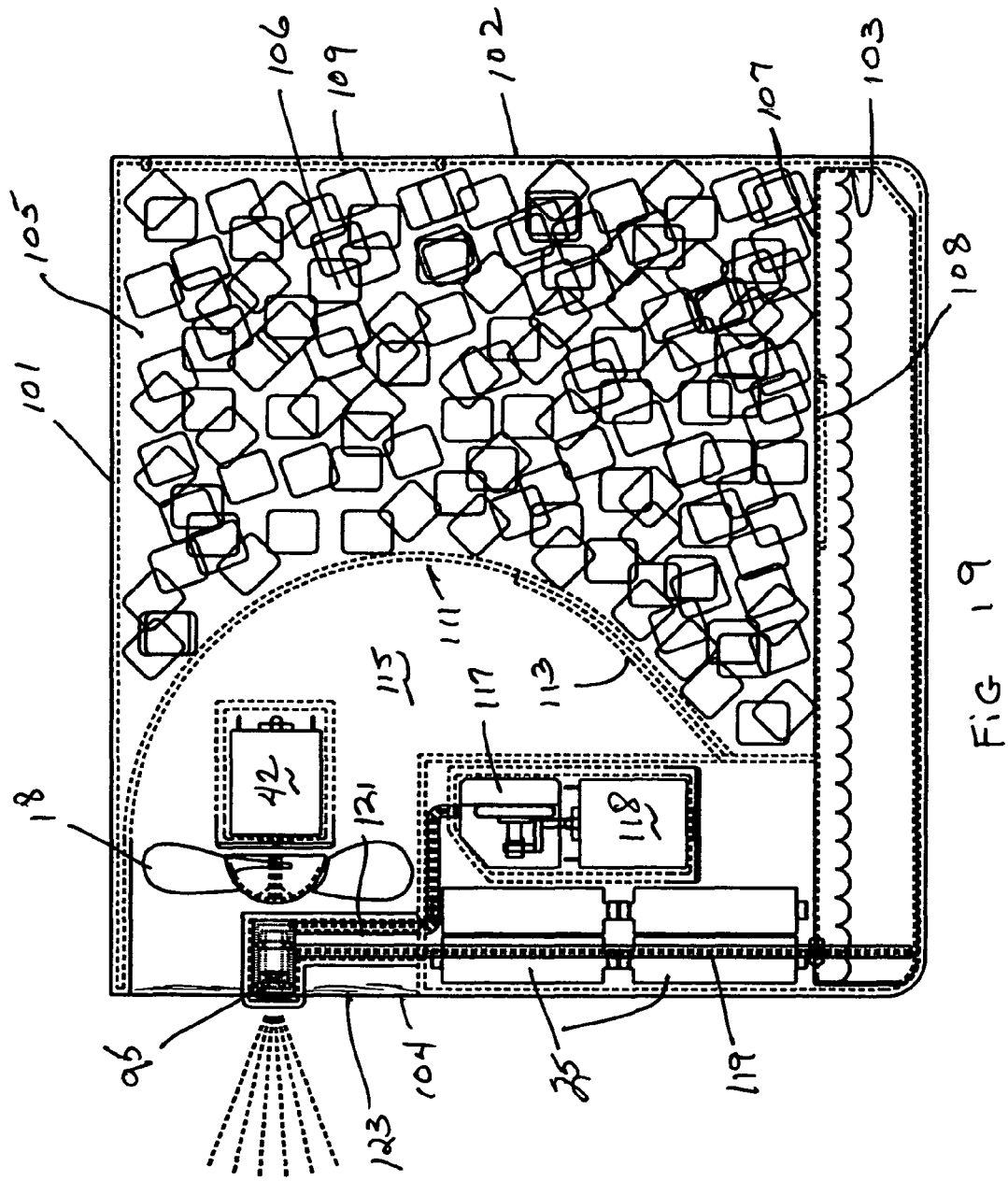
FIG. 19 is a side elevational view, in cross section showing a further variation of a portable misting fan device that assumes a box configuration but nevertheless employs a power misting fan device for providing a cooled misted fluid to the user.

The variation as shown in FIG. 19 of the drawings shows a still further possible variation for a portable misting fan device. In this embodiment, the body is in a form of casing 101 which carries therein a reservoir 103 that is provided with a fluid source such as water. A fill port (not shown) may be provided for introducing the fluid into or out of the reservoir 103. It will be observed that in this embodiment, the reservoir 103 is separated from an upper compartment 105 that is sized to be sufficiently large enough to accommodate ice 106 therein. The upper compartment 105 is separated from the reservoir 103 by a wall 107 that includes a drain 108 formed therein. Casing 101 has a rear wall 102 and a front wall 104. The rear wall 102 is provided with an air inlet vent 109. The upper compartment 105 is bounded by a forward wall 111 that is also provided with an air outlet vent 113 therein. The casing 101 includes forward compartment 115 in which is mounted the impeller 18 which is operated by means of a fan motor 42 as previously described. The front wall 104 is provided with an aspirator nozzle 95 that, in this embodiment, is positioned just forwardly of the impeller 18. The forward compartment 115 is also provided with an air pump 117, which in turn is operated by means of the air pump motor 118. The electrical power source includes a plurality of batteries 25 in the same manner as previously indicated with respect to the other embodiments. Appropriate electrical contacts are installed such that the batteries 25 are in contact with the air pump motor 118 and the fan motor 42. It will be observed that the aspirator nozzle 95 is in fluid communication with the reservoir 103 by means of the dip tube 119 and is in communication with the air pump 117 by means of a supply tube 121.

It will be clear that the device will operate as a portable misting fan device since once the impeller is actuated by actuating the motor 42, air will be drawn through the air inlet vent 109 and passes through the upper compartment 105 exiting therefrom via the air outlet vent 113. The front wall is provided with a vent 123 through which the air drawn through the upper compartment and the forward compartment will exit. It will also be clear that the air is cooled as a result of the ice 106 contained in the upper compartment 105. The aspirator nozzle 95 will operate once the air pump 117 has been activated via the air pump motor 118 via appropriate switches and controls. The aspirator nozzle 95 will draw liquid from the reservoir 103 as well as compressed air from the air pump 117, and provide a cooled mist exiting from the aspirator nozzle 95. The impeller 18 enhances the cooling effect.

It will further be observed that as the ice 106 melts in the upper compartment 105, the melting ice will drain into reservoir 103 via the wall drain 108 and hence, the fluids supplied to the aspirator nozzle 95 will similarly be cooled water.

The import of the embodiment as demonstrated in FIG. 19 is to show that the portable misting fan device of the present invention may be adjusted from a size consideration to accommodate a cooling effect for more than a single person. It is contemplated that the device as exemplified in FIG. 19 is suitable for outdoor functions such as a patio, deck, beach environment, or other outdoor venues where there may be more than one person present. The device may be suitably accommodated with a handle positioned on the top of the device for carrying purposes. As such, the device comprises a portable misting fan device suitable for cooling one or even more than one person.

The above description is intended to demonstrate that a power misting device is created in various formats, which has the end result of providing a misted fluid to an air stream on a pressurized basis. The pressure may be created by means of a pump operated with a motor, or a manual pump and piston arrangement, or a drive and pulley arrangement. It is contemplated that other variations are possible, so long as pressure is generated in order to pressurize the fluid emanating from the reservoir. The present invention further demonstrates the ability to provide a portable misting fan wherein, as one variation, separate motors may be provided for the fan and the mist generator, and provide an actuator button that will operate the fan motor and the mist generator separately, or in combination. This provides a device that can operate as a fan alone, or as a misting device alone, or a combination fan and misting device.

The device further contemplates that the discharge nozzle may take various forms. For example, an aspirator nozzle may be used, or a conventional spray nozzle. The nozzle may be designed to operate from an high pressure, or low pressure reservoir, as indicated previously. The ultimate purpose is to provide a misted fluid to a discharged outlet that can be introduced into the air stream created by the fan. As was previously indicated, however, the device may be designed without fan means or an impeller such that one is simply discharging a water mist into the air to achieve a cooling effect for the user. In such variations, the aspirator type nozzle will entrain the droplets in an air jet created by the nozzle, propelling the mist forward.

It will be appreciated from the above description taken in conjunction with the drawings that the preferred embodiments of the invention are disclosed. However, it is also clear that various modifications and variation may be created without departing from the scope and spirit of the invention. Hence, while there has been described what is at present considered to be the preferred embodiments of the invention, the obvious variations and modifications are intended to be covered by the appended claims.

| | |
|---|---|
| 0 | |
| 1 | |
| 2 | |
| 3 | |
| 4 | |
| 5 | |
| 6 | |
| 7 | |
| 8 | |
| 9 | |
| 10 | main body |
| 11 | |
| 12 | lower body |
| 13 | |
| 14 | upper body |
| 15 | port |
| 16 | shroud |
| 17 | grille |
| 18 | impeller (fan) |
| 19 | removable rod |
| 20 | reservoir |
| 21 | rear lid |
| 22 | pivot pin |
| 23 | rear fill port |
| 24 | fluid source |
| 25 | batteries |
| 26 | tube fitting aperture |
| 27 | battery lid |
| 28 | tube fitting |
| 29 | fill cap |
| 30 | dip tube |
| 31 | pivot |
| 32 | pump |
| 33 | |
| 34 | motor |
| 35 | actuator button |
| 36 | battery contact |
| 37 | |
| 38 | supply tube |
| 39 | |
| 40 | discharge nozzle |
| 41 | motor shaft |
| 42 | fan motor |
| 43 | support strut |
| 44 | support strut |
| 45 | |
| 46 | electrical contacts |
| 47 | reservoir vent |
| 48 | |
| 49 | |
| 50 | high pressure reservoir |
| 51 | |
| 52 | air filled bladder |
| 53 | |
| 54 | pump discharge tube |
| 55 | |
| 56 | high press supply tube |
| 57 | |
| 58 | pressure regulator |
| 59 | supply tube |

-continued

| | |
|---|---|
| 60 | valve |
| 61 | high pressure switch |
| 62 | |
| 63 | low pressure switch |
| 64 | pump inlet tube |
| 65 | |
| 66 | pump discharge tube |
| 67 | |
| 68 | casing |
| 69 | pivots |
| 70 | pump cylinder |
| 71 | pump piston |
| 72 | piston handle |
| 73 | |
| 74 | check valve |
| 75 | |
| 76 | threading |
| 77 | pump cap |
| 78 | upper pulley |
| 79 | lower pulley |
| 80 | drive belt |
| 81 | bladder |
| 82 | |
| 83 | supply tube |
| 84 | |
| 85 | bladder fitting |
| 86 | fill port |
| 87 | fill cap |
| 88 | fill collar fitting |
| 89 | bladder handle |
| 90 | |
| 91 | hanger |
| 92 | |
| 93 | |
| 94 | |
| 95 | aspirator nozzle |
| 96 | water supply tube |
| 97 | |
| 98 | switch/actuator |
| 99 | |
| 100 | |
| 101 | casing |
| 102 | rear wall |
| 103 | reservoir |
| 104 | front wall |
| 105 | upper compartment |
| 106 | ice |
| 107 | wall |
| 108 | drain |
| 109 | air inlet vent |
| 110 | |
| 111 | forward wall |
| 112 | |
| 113 | air inlet vent |
| 114 | |
| 115 | forward compartment |
| 116 | |
| 117 | air pump |
| 118 | air pump motor |
| 119 | dip tube |
| 120 | |
| 121 | air supply tube |
| 122 | |
| 123 | vent |

The invention claimed is:

1. A portable misting fan device of the type formed by a body carrying fan means for creating and moving a stream of air, the body further accommodating a power source for driving the fan means and electrical means for driving the power source, the improvement comprising, in combination,
   (a) the body further including a separate compartment therein, said separate compartment being sized to receive and store a supply of ice,
   (b) said separate compartment provided with vent means for establishing an air path therethrough,
   (c) said fan means being positioned within said body to facilitate the movement of air through said separate compartment,
   (d) a powered mist generator carried within said body,
   (e) driving means associated with said mist generator for driving said mist generator,
   (f) actuator means in communication with said driving means for actuating said driving means and in turn, actuating said mist generator,
   (g) said mist generator being in fluid communication with a reservoir to be provided with a fluid source,
   (h) and a mist nozzle to receive a fluid mist from the mist generator and direct the mist into the air stream created by the fan means when said fan means is activated,
   (i) whereby activation of the fan means will draw air through said separate compartment to provide a stream of cooled air and activation of said mist generator will provide a stream of misted fluid.

2. The portable misting fan device as set forth in claim 1 above, wherein said vent means associated with said separate compartment comprises a first air inlet vent for bringing air into said separate compartment, and a second air outlet vent for allowing air to pass out of said separate compartment.

3. The portable misting fan device as set forth in claim 1 above, wherein said separate compartment further includes drain means associated therewith,
   (a) said drain means being in fluid communication with said reservoir such that ice melting in said separate compartment will drain into said reservoir thereby to provide a supply of cooled fluid to said reservoir.

4. An improved portable misting fan device of the type formed by a body carrying fan means for creating and moving a stream of air, the body further accommodating a reservoir for providing a fluid source, and the body further accommodating a power source for driving the fan means and electrical means for driving the power source, the improvement comprising in combination,
   (a) said body includes a separate compartment therein, said separate compartment being sized to receive and store a supply of ice,
   (b) said separate compartment provided with vent means for establishing an air path therethrough,
   (c) said separate compartment having drain means associated therewith, said drain means being in fluid communication with the reservoir such that melting ice will drain into the reservoir, whereby activation of the fan means draws air through said separate compartment via said vent means to provide a stream of cooled air,
   (d) a powered mist generator carried within said body,
   (e) driving means associated with said mist generator for driving said mist generator,
   (f) actuator means in communication with said driving means for actuating said driving means and in turn, actuating said mist generator,
   (g) said mist generator being in fluid communication with the reservoir to be provided with a fluid source,
   (h) and a mist nozzle to receive a fluid mist from the mist generator and direct the mist into the air stream created by the fan means when said fan means is activated, and
   (i) whereby actuation of said powered mist generator provides a continuous stream of fluid mist into the air stream created by said fan means.

* * * * *